United States Patent
Ni et al.

(10) Patent No.: US 8,116,083 B2
(45) Date of Patent: *Feb. 14, 2012

(54) LIPSTICK-TYPE USB DEVICE WITH TUBULAR HOUSING

(75) Inventors: Jim Chin-Nan Ni, San Jose, CA (US); Abraham C. Ma, Fremont, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,892

(22) Filed: Nov. 10, 2010

(65) Prior Publication Data

US 2011/0059636 A1 Mar. 10, 2011

Related U.S. Application Data

(63) Continuation-in-part of application No. 12/505,327, filed on Jul. 17, 2009, now Pat. No. 7,850,468, and a continuation-in-part of application No. 12/361,772, filed on Jan. 29, 2009, now Pat. No. 7,869,219, and a continuation-in-part of application No. 12/025,706, filed on Feb. 4, 2008, now Pat. No. 7,886,108, and a continuation-in-part of application No. 11/950,190, filed on Dec. 4, 2007, now Pat. No. 8,014,130.

(51) Int. Cl.
*H05K 1/14* (2006.01)
(52) U.S. Cl. ...................................... 361/737
(58) Field of Classification Search .................. 439/131; 361/737, 734
See application file for complete search history.

(56) References Cited

U.S. PATENT DOCUMENTS

| | | | |
|---|---|---|---|
| 4,582,985 A | 4/1986 | Lofberg |
| 4,630,201 A | 12/1986 | White |
| 4,766,293 A | 8/1988 | Boston |
| 4,833,554 A | 5/1989 | Dalziel et al. |
| 4,926,480 A | 5/1990 | Chaum |
| 5,020,105 A | 5/1991 | Rosen et al. |
| 5,180,901 A | 1/1993 | Hiramatsu |
| 5,280,527 A | 1/1994 | Gullman et al. |
| 5,386,527 A | 1/1995 | Bosshart |
| 5,404,485 A | 4/1995 | Ban |
| 5,430,859 A | 7/1995 | Norman et al. |
| 5,479,638 A | 12/1995 | Assar et al. |

(Continued)

FOREIGN PATENT DOCUMENTS

JP 63-163589 A 7/1988

(Continued)

*Primary Examiner* — Phuong Dinh
(74) *Attorney, Agent, or Firm* — Bever, Hoffman & Harms, LLP; Patrick T. Bever

(57) ABSTRACT

A USB device including a tubular housing and a rear cap assembly including a handle structure that is rotatably connected to the tubular housing to facilitate deploying and retracting a plug connector through a front opening of the housing. The plug connector is fixedly connected onto the front end of a sliding rack assembly that is disposed in housing such that the sliding rack assembly is slidable along a longitudinal axis. The sliding rack assembly includes a carrier including a carrier tray for supporting electronic devices and an elongated positioning rod extending from a rear portion of the carrier tray. The positioning rod is operably engaged with an actuator portion such that manual rotation of the rear cap handle structure relative to the housing around the longitudinal axis causes the sliding rack assembly to slide inside the housing between retracted and deployed positions.

19 Claims, 17 Drawing Sheets

U.S. PATENT DOCUMENTS

| | | |
|---|---|---|
| 5,623,552 A | 4/1997 | Lane |
| 5,797,771 A | 8/1998 | Garside |
| 5,835,760 A | 11/1998 | Harmer |
| 5,859,766 A | 1/1999 | Van Scyoc et al. |
| 5,899,773 A | 5/1999 | Cheng |
| 5,907,856 A | 5/1999 | Estakhri et al. |
| 5,936,884 A | 8/1999 | Hasbun et al. |
| 5,959,541 A | 9/1999 | DiMaria et al. |
| 5,984,731 A | 11/1999 | Laity |
| 6,000,006 A | 12/1999 | Bruce et al. |
| 6,012,636 A | 1/2000 | Smith |
| 6,044,428 A | 3/2000 | Rayabhari |
| 6,069,920 A | 5/2000 | Schulz et al. |
| 6,069,970 A | 5/2000 | Salatino et al. |
| 6,081,858 A | 6/2000 | Abudayyeh et al. |
| 6,125,192 A | 9/2000 | Bjorn et al. |
| 6,132,243 A | 10/2000 | Hirata et al. |
| 6,145,069 A | 11/2000 | Dye |
| 6,148,354 A | 11/2000 | Ban et al. |
| 6,159,039 A | 12/2000 | Wu |
| 6,193,152 B1 | 2/2001 | Fernando et al. |
| 6,202,138 B1 | 3/2001 | Estakhri et al. |
| 6,230,233 B1 | 5/2001 | Lofgren et al. |
| 6,275,894 B1 | 8/2001 | Kuo et al. |
| 6,279,955 B1 | 8/2001 | Fisher |
| 6,292,863 B1 | 9/2001 | Terasaki et al. |
| 6,321,478 B1 | 11/2001 | Klebes |
| 6,334,793 B1 | 1/2002 | Amoni et al. |
| 6,438,638 B1 | 8/2002 | Jones et al. |
| 6,456,500 B1 | 9/2002 | Chen |
| 6,480,390 B2 | 11/2002 | Matsumiya et al. |
| 6,547,130 B1 | 4/2003 | Shen |
| 6,554,648 B2 | 4/2003 | Shi et al. |
| 6,567,273 B1 | 5/2003 | Liu et al. |
| 6,615,404 B1 | 9/2003 | Garfunkel et al. |
| 6,618,243 B1 | 9/2003 | Tirosh |
| 6,636,929 B1 | 10/2003 | Frantz et al. |
| 6,676,419 B1 | 1/2004 | Lin et al. |
| 6,718,407 B2 | 4/2004 | Martwick |
| 6,737,591 B1 | 5/2004 | Lapstun et al. |
| 6,743,030 B2 | 6/2004 | Lin et al. |
| 6,763,410 B2 | 7/2004 | Yu |
| D494,969 S | 8/2004 | Lin |
| 6,778,401 B1 | 8/2004 | Yu et al. |
| 6,792,487 B2 | 9/2004 | Kao |
| 6,808,400 B2 | 10/2004 | Tu |
| 6,854,984 B1 | 2/2005 | Lee et al. |
| 6,880,024 B2 | 4/2005 | Chen et al. |
| 6,999,322 B1 | 2/2006 | Lin |
| 7,004,780 B1 | 2/2006 | Wang |
| 7,021,971 B2 | 4/2006 | Chou et al. |
| 7,044,802 B2 | 5/2006 | Chiou et al. |
| 7,069,370 B2 | 6/2006 | Sukegawa et al. |
| 7,074,052 B1 | 7/2006 | Ni et al. |
| 7,090,541 B1 | 8/2006 | Ho |
| 7,092,256 B1 | 8/2006 | Salazar et al. |
| 7,097,472 B2 | 8/2006 | Parker |
| 7,103,684 B2 | 9/2006 | Chen et al. |
| 7,103,765 B2 | 9/2006 | Chen |
| 7,104,848 B1 | 9/2006 | Chou et al. |
| 7,125,287 B1 | 10/2006 | Chou et al. |
| 7,155,545 B1 | 12/2006 | Wang |
| 7,172,460 B2 | 2/2007 | Zhao et al. |
| 7,182,646 B1 | 2/2007 | Chou et al. |
| 7,214,075 B2 | 5/2007 | He et al. |
| 7,249,978 B1 | 7/2007 | Ni |
| 7,257,714 B1 | 8/2007 | Shen |
| 7,259,967 B2 | 8/2007 | Ni |
| 7,264,992 B2 | 9/2007 | Hsueh et al. |
| 7,269,004 B1 | 9/2007 | Ni et al. |
| 7,287,705 B2 | 10/2007 | Tang |
| 7,303,411 B1 | 12/2007 | Morganstern et al. |
| 7,359,208 B2 | 4/2008 | Ni |
| 7,361,059 B2 | 4/2008 | Harkabi et al. |
| 7,366,028 B2 | 4/2008 | Kagan et al. |
| 7,376,011 B2 | 5/2008 | Conley et al. |
| 7,386,655 B2 | 6/2008 | Gorobets et al. |
| 7,389,397 B2 | 6/2008 | Paley et al. |
| 7,395,384 B2 | 7/2008 | Sinclair et al. |
| 7,407,393 B2 | 8/2008 | Ni et al. |
| 7,420,803 B2 | 9/2008 | Hsueh et al. |
| 7,524,198 B2 | 4/2009 | Nguyen et al. |
| 7,581,967 B2 | 9/2009 | Collantes, Jr. et al. |
| 7,850,468 B2 * | 12/2010 | Ni et al. ........................ 439/131 |
| 2001/0043174 A1 | 11/2001 | Jacobsen et al. |
| 2002/0036922 A1 | 3/2002 | Roohparvar |
| 2002/0166023 A1 | 11/2002 | Nolan et al. |
| 2003/0046510 A1 | 3/2003 | North |
| 2003/0100203 A1 | 5/2003 | Yen |
| 2003/0163656 A1 | 8/2003 | Ganton |
| 2003/0177300 A1 | 9/2003 | Lee et al. |
| 2003/0182528 A1 | 9/2003 | Ajiro |
| 2004/0034765 A1 | 2/2004 | O'Connell |
| 2004/0148482 A1 | 7/2004 | Grundy et al. |
| 2004/0153595 A1 | 8/2004 | Sukegawa et al. |
| 2004/0255054 A1 | 12/2004 | Pua et al. |
| 2005/0009388 A1 | 1/2005 | Chao |
| 2005/0085133 A1 | 4/2005 | Wang et al. |
| 2005/0102444 A1 | 5/2005 | Cruz |
| 2005/0114587 A1 | 5/2005 | Chou et al. |
| 2005/0120146 A1 | 6/2005 | Chen et al. |
| 2005/0160213 A1 | 7/2005 | Chen |
| 2005/0182858 A1 | 8/2005 | Lo et al. |
| 2005/0193161 A1 | 9/2005 | Lee et al. |
| 2005/0193162 A1 | 9/2005 | Chou et al. |
| 2005/0216624 A1 | 9/2005 | Deng et al. |
| 2005/0223158 A1 | 10/2005 | See et al. |
| 2005/0246243 A1 | 11/2005 | Adams et al. |
| 2005/0268082 A1 | 12/2005 | Poisner |
| 2005/0271458 A1 | 12/2005 | Kui |
| 2006/0065743 A1 | 3/2006 | Fruhauf |
| 2006/0075174 A1 | 4/2006 | Vuong |
| 2006/0106962 A1 | 5/2006 | Woodbridge et al. |
| 2006/0161725 A1 | 7/2006 | Lee et al. |
| 2006/0184709 A1 | 8/2006 | Sukegawa et al. |
| 2006/0206702 A1 | 9/2006 | Fausak |
| 2006/0234533 A1 | 10/2006 | Lei et al. |
| 2006/0242395 A1 | 10/2006 | Fausak |
| 2007/0079043 A1 | 4/2007 | Yu et al. |
| 2007/0094489 A1 | 4/2007 | Ota et al. |
| 2007/0113067 A1 | 5/2007 | Oh et al. |
| 2007/0113267 A1 | 5/2007 | Iwanski et al. |
| 2007/0130436 A1 | 6/2007 | Shen |
| 2007/0171620 A1 | 7/2007 | Lee |
| 2008/0160832 A1 | 7/2008 | Morganstern et al. |
| 2008/0232060 A1 | 9/2008 | Yu et al. |
| 2008/0261450 A1 | 10/2008 | Nguyen et al. |
| 2009/0124104 A1 | 5/2009 | Zhu et al. |
| 2010/0124831 A1 | 5/2010 | Chou et al. |

FOREIGN PATENT DOCUMENTS

| | | |
|---|---|---|
| JP | 02-118790 A | 5/1990 |
| JP | 11-039483 | 2/1999 |

\* cited by examiner

LIPSTICK-TYPE USB DEVICE WITH TUBULAR HOUSING

RELATED APPLICATIONS

This application is continuation-in-part of U.S. patent application for "LIPSTICK-TYPE USB DEVICE", U.S. application Ser. No. 12/505,327, filed on Jul. 17, 2009.

This application is also a CIP of U.S. patent application for "FLASH DRIVE WITH SPRING-LOADED RETRACTABLE CONNECTOR", U.S. application Ser. No. 12/361,772, filed on Jan. 29, 2009.

This application is also a CIP of U.S. patent application for "Methods and Systems of Managing Memory Addresses in a Large Capacity Multi-Level Cell (MLC) based flash memory device", U.S. application Ser. No. 12/025,706, filed Feb. 4, 2008.

This application is also a CIP of U.S. patent application for "Pen-Like Universal Serial Bus (USB) Flash Drive with Deploying and Retracting Functionalities", U.S. application Ser. No. 11/950,190, filed Dec. 4, 2007.

FIELD OF THE INVENTION

This invention relates to portable electronic devices, and more particularly to portable electronic devices such as those that utilize the Universal-Serial-Bus (USB) specification.

BACKGROUND OF THE INVENTION

In the past, confidential data files were stored in floppy disks or were delivered via networks that require passwords or that use encryption coding for security. Confidential documents can be sent by adding safety seals and impressions during delivering. However, the aforesaid are exposed to the risks of breaking of the passwords, encryption codes, safety seals and impressions, thereby resulting in unsecure transfer of information.

More recently, there is an ongoing trend towards the use of miniaturized, portable computer peripheral devices to store confidential data. In certain cases, such peripheral devices have been reduced to "pocket size", meaning that they can literally be carried in a user's pocket in the same manner as a wallet or set of keys. One example of particular interest, in which context the present invention will be described herein, is a "flash disk", "Universal Serial Bus (USB) flash drive", or simply "USB device".

USB flash drives are available in various shapes and forms. The USB flash drive uses a USB (male) plug connector to be coupled to a USB (female) plug socket (port) provided on a host device such as a PC. A problem associated with USB flash drives is that the USB (male) plug connector must be kept covered when not in use in order to prevent contamination of the contact pads, which would prevent the USB device from operating properly when plugged into a (female) plug socket connected to a host system. The USB flash drive generally includes a metal or plastic casing and a cap which is screwed or otherwise attached to the casing over the USB plug connector during transport (non-operation) periods. When operation of the USB flash drive is desired, the USB plug connector is accessed by removing the cap from the casing, thus exposing the plug connector for insertion into the host system port. When the desired operation is completed, the USB flash drive is pulled to extract the plug connector from the port, and then the cap is reattached onto the casing over the plug connector.

A problem with conventional removable-cap-type USB flash drives is that, once the cap is removed, it may be lost or forgotten, thereby exposing the plug connector to contamination or damage during subsequent transport periods, thereby risking failure of the USB flash drive and the loss of valuable information.

A conventional solution for the problem of keeping the plug connector clean during transport without using a detachable cap is to provide a USB device with a retractable plug connector in which an actuator is used to retract the plug connector into the device housing during transport, and to deploy (extend) the plug connector from an opening in the front of the housing for plugging into a host system during operation. Conventional USB devices that utilize retracting actuators are referred to as "pen-type" USB devices, and utilize a press-push (thumb-button) actuator accessible by way of a slot defined in a side or edge wall of the housing.

A problem with conventional pen-type USB devices is that the press-push actuator can become fouled or otherwise jam after repeated use, which can cause the actuator to become painful to operate, and may fail entirely, thereby causing the loss of valuable information.

What is needed is a retractable portable computer peripheral device that overcomes the problems associated with conventional retractable structures. What is particularly needed is a high quality retractable USB device that has a very low production cost, and provides a reliable deploying mechanism that allows a user to comfortably apply a significant actuating force.

SUMMARY OF THE INVENTION

The present invention is directed to a lipstick-type USB device (or other portable computer peripheral apparatus utilizing a lipstick-type actuator) including a rear cap assembly including a rear cap that is rotatably connected to a single-piece tubular housing, and an actuator portion that is operably engaged with a positioning structure disposed on an elongated positioning rod extending from the rear of a sliding rack assembly that is movably disposed in the tubular housing. With this arrangement, when the rear cap is manually rotated by a user around a longitudinal axis, the sliding rack assembly is caused to move along the longitudinal axis inside the tubular housing, thereby causing a plug connector disposed on a front end of the sliding rack assembly to move between a retracted position inside the tubular housing and a deployed position in which the plug connector is exposed outside a front opening of the tubular housing for operable coupling to a host system. The rear cap and tubular housing remain rotatably connected together at all times (i.e., such that the rear cap remains secured to the tubular housing (a) in a deployed position when the plug connector is extended through the front opening of the tubular housing to facilitate connection of the plug connector to a host system during operating periods, (b) in a retracted position when the plug connector is positioned inside the tubular housing when the USB device is not in use, and (c) during movement of the plug connector between the deployed and retracted positions), thereby preventing loss of the rear cap during operation.

According to one embodiment, the positioning structure includes a positioning knob that is disposed on the positioning rod, the actuator portion of the rear cap includes one of an oval cam surface and a spiral groove, and the positioning knob is operably engaged with the cam surface/spiral groove such that the positioning knob remains coupled to the actuator portion while the sliding rack assembly is slid between the retracted position and the deployed position. By providing such a lipstick-type actuating mechanism in which the plug connector is deployed and retracted by rotating a rear cap relative to the tubular housing, the present invention provides a convenient, reliable and easy to use retractable USB device that avoids fouling or jamming after repeated use by avoiding slots or other openings into the tubular housing, and thereby avoiding the loss of valuable information by preventing failure of the USB device to deploy. In addition, by utilizing a positioning rod that extends from the rear end of a sliding rack assembly and operably engages an actuating portion of the rear cap, the present invention provides a high quality retractable USB device that has a very low production cost, and provides a reliable deploying mechanism that allows a user to comfortably apply a significant actuating force.

According to an aspect of the invention, the rear cap handle structure includes opposing upper, lower and side walls that have the same shape and spacing as upper, lower and side walls of the tubular housing, and the actuating mechanism is disposed such that the upper and lower walls of the rear cap handle structure form a substantially continuous surface with the opposing upper and lower walls of the tubular housing when the plug connector is in both the fully deployed and fully retracted positions, thereby providing an aesthetically pleasing package that can be comfortably carried in a user's pocket. In one embodiment, both the tubular housing and the rear cap include planar walls that align to form substantially continuous co-planar surfaces when the plug connector is in both the fully deployed and fully retracted positions. In other embodiments, both the tubular housing and the rear cap include curved walls that form continuous curved surfaces when the plug connector is in both the fully deployed and fully retracted positions.

According to an aspect of the present invention, the rear cap assembly includes a "hidden" coupling structure (e.g., a snap ring) that serves to rotatably secure the rear cap handle structure to the tubular housing in an aesthetically pleasing manner. The coupling structure includes a flat wall having a peripheral edge that is sized to fit within a seat formed in the rear edge of the tubular housing such that the flat wall aligns with the rear edge to essentially close off the rear opening of the tubular housing. The coupling structure also includes several locking structures that protrude from the flat wall that fixedly engage with protrusions (first locking structures) disposed inside the central chamber, thereby fixedly connecting the coupling structure to the tubular housing. The flat wall defines a central opening and multiple radial slits extending radially outward from the central opening that facilitate insertion of a corresponding mounting structure disposed on a front portion of rear cap handle structure. That is, the radial slits allow portions of flat wall to temporarily bend inward when the mounting structure is pressed through the center opening, and when the mounting structure clears the central opening, these portions then resiliently return to the planar shape of the flat wall and engage with a bearing slot formed on the handle structure, whereby the rear cap handle structure is rotatably connected to the tubular housing by way of the coupling structure. Because the flat wall aligns with the rear edge of the tubular housing, the front edge of the rear cap handle structure can be positioned very close to the rear edge of the tubular housing (i.e., with a minimal gap), thereby further enhancing the substantially continuous surface formed by the tubular housing and the rear cap handle structure.

According to at least one specific embodiment of the present invention, the lipstick-type USB device further includes a spring (or other resilient member) that is disposed inside the tubular housing and operably arranged to bias the sliding movement sliding rack assembly along the longitudinal axis inside the tubular housing. In one specific embodiment, the spring is a coil spring disposed between a portion of the sliding rack assembly and the front portion of the tubular housing, and biases the sliding movement sliding rack assembly along the longitudinal axis toward the rear cap assembly. With this arrangement, the spring helps to maintain operable engagement between the actuator portion and the positioning structure, thereby providing a desirable "automatic retraction" feature that forces retraction of the plug connector into the tubular housing when the handle structure is rotated out of the deployed position.

According to specific embodiments of the present invention, a lipstick-type USB device includes a deploy/retract actuator constructed such that the rotatable cap is freely rotatable around the longitudinal axis relative to the tubular housing an unlimited number of full rotations in both the clockwise and counterclockwise directions. In particular, the deploy/retract actuator is constructed such that, when the rotatable cap is rotated in a clockwise/counterclockwise direction until the plug connector is fully retracted or fully deployed, further rotation of the clockwise/counterclockwise direction is not impeded, thereby preventing damage to the deploy/retract actuator mechanism caused by over-rotation of the rotating cap when the sliding rack assembly reaches the fully deployed or fully retracted positions inside the tubular housing.

According to a specific embodiment of the present invention, the actuator portion includes a substantially oval cam surface, and the rack assembly carrier includes one or more positioning knobs that are disposed on the positioning rod and operably engaged with the substantially oval cam surface. A spring (or other resilient member) is disposed inside the tubular housing, and serves to bias the sliding rack assembly toward the rear cap assembly, thereby maintaining the positioning knob in contact with the cam surface. In response to rotation of the rear cap handle structure, the substantially oval cam surface applies a force against the positioning knob that is transferred to the sliding rack assembly by the positioning rod. When rotation of the rear cap causes the positioning knob to slide on a forward slanting portion of the cam surface, the sliding rack assembly is pushed forward against the spring bias, and the plug connector is moved through the front opening into the deployed position in which the plug connector is exposed for operable coupling to a host system. When rotation of the rear cap causes the positioning knob to slide on a backward slanting portion of the cam surface, the spring bias pushes the sliding rack assembly toward the back of the tubular housing, thereby moving the plug connector into a retracted position in which said plug connector is fully retracted inside the tubular housing. This arrangement allows the cap to freely rotate around the longitudinal axis relative to the tubular housing an unlimited number of full rotations in both the clockwise and counterclockwise directions without worrying about applying a damaging torque to the actuating mechanism.

According to an aspect of the invention, locking grooves are provided on the substantially oval cam surface to conveniently hold the sliding rack mechanism in the fully deployed and fully retracted positions. In particular, the positioning knobs slide along the cam surface between a forward (first) locking groove that holds the USB device in the fully deployed position, and a rear (second) locking groove that holds the USB device in the fully retracted position. The locking grooves are formed such that a user must apply a relatively large force to the rear cap in order to displace the positioning knob out of the locking grooves, thereby preventing undesirable deploying or retraction of the plug connector.

According to alternative embodiments of the invention, the substantially oval cam surface of the actuator portion is either disposed on a mounting structure extending from the handle structure into the tubular housing, or formed on a mounting structure disposed inside a hollow region of the rear cap handle structure. In at least one specific embodiment, the actuator portion is integrally formed with the rear cap handle structure, and includes a hollow cylindrical wedge-shaped structure extending from the rear cap into the tubular housing, where the hollow cylindrical wedge-shaped mounting structure has a peripheral edge defining the substantially oval cam surface. In another specific embodiment, the actuator portion includes a separately molded rotary sleeve that is inserted inside hollow cylindrical mounting structure that is integrally molded inside rear cap handle structure. In these specific embodiments, the positioning knob disposed on the positioning rod extending from the rear end of the sliding rack assembly is pressed against the substantially oval cam surface by the spring, thereby facilitating reliable positioning of the plug connector.

According to another embodiment, a lipstick-type USB device similar to that described above is characterized in that the biasing spring utilized in the embodiments described above is omitted by providing an oval cam channel on an inside surface of the handle structure, and disposing the positioning knob inside the oval cam channel. In a specific embodiment, the rear cap assembly includes an upper handle portion having a first oval cam surface portion, and a lower handle portion having a second oval cam surface portion, the upper and lower handle portions being formed such that the oval cam channel is defined between the first and second oval cam surface portions when the upper handle portion is operably mounted onto the lower handle portion.

According to various alternative embodiments, the specific USB device packages described herein may be modified to house a conventional PCBA structure, a PCBA constructed using a chip-on-board (COB) process, or a PCBA constructed using a surface-mount technology (SMT) slim type PCBA process. The various structures may also be utilized to produce other types of portable computer peripheral apparatus, including one based on the Secure Digital (SD) standard, the Micro SD standard, the Multi-Media Card (MMC) standard, the Compact Flash (CF) standard, the Memory Stick (MS) standard, the PCI-Express standard, the Integrated Drive Electronics (IDE) standard, the Serial Advanced Technology Attachment (SATA) standard, the external SATA standard, the Radio Frequency Identification (RFID) standard, a fiber channel standard and an optical connection protocol standard.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in low-profile USB connectors. The following description is presented to enable one of ordinary skill in the art to make and use the invention as provided in the context of a particular application and its requirements. As used herein, directional terms such as "front", "back" "upper", "upwards", "lower", "side", "upward" and "downward" are intended to provide relative positions for purposes of description, and are not intended to designate an absolute frame of reference. In addition, the term "integrally molded" is intended to mean that the subject items are formed together in a single molding process, as opposed to being formed separately and then connected, e.g., by adhesive. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
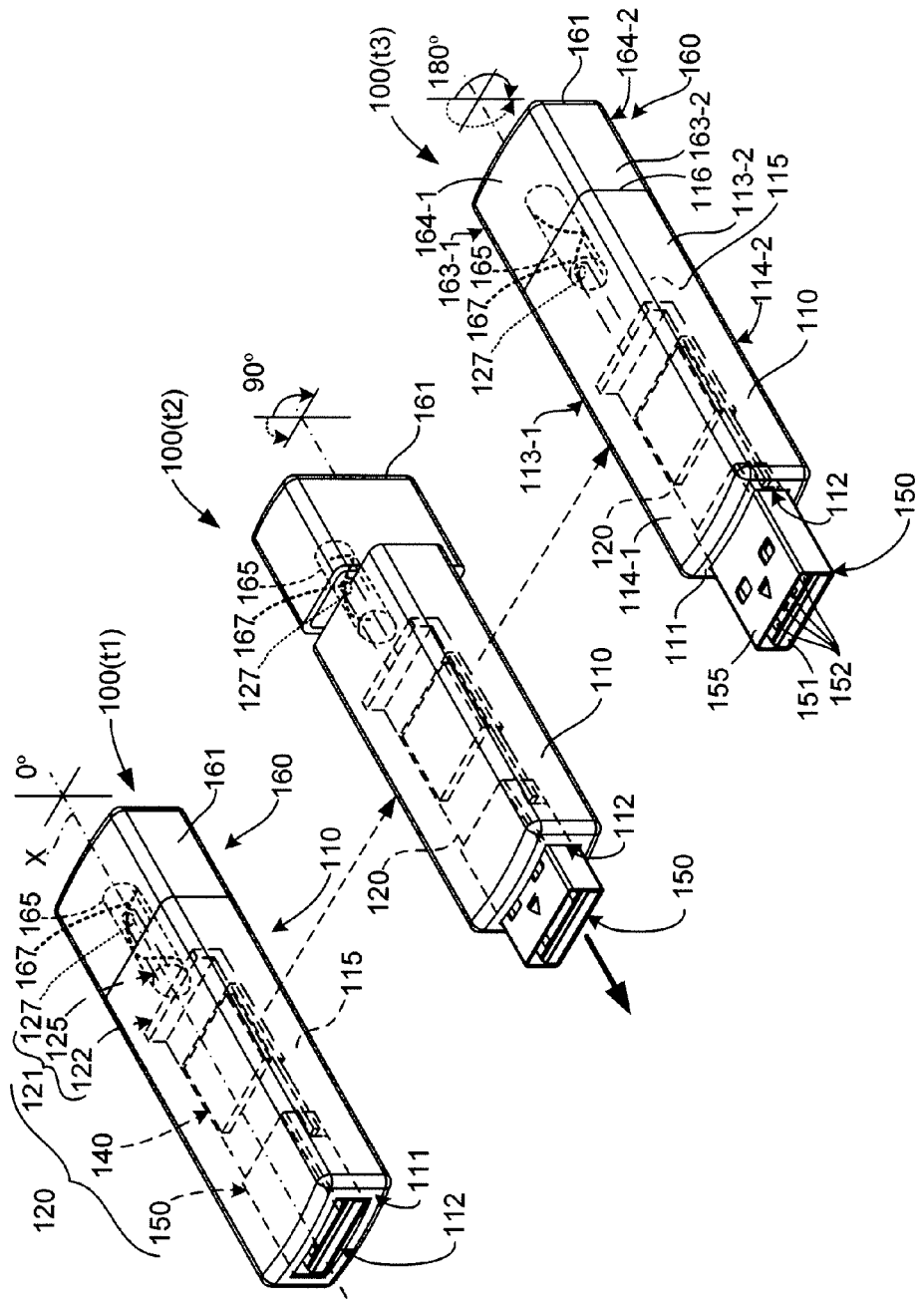
FIG. 1 includes sequential perspective views showing an exemplary USB device according to a generalized embodiment of the present invention during operation.

FIG. 1 includes sequential perspective views showing an exemplary lipstick-type USB device (portable computer peripheral apparatus) 100 according to a generalized embodiment of the present invention. Referring to the left side of FIG. 1, lipstick-type USB device 100 generally includes a single-piece tubular housing 110, a sliding rack assembly 120 movably disposed in the housing, and a rear cap assembly 160 including a rear cap handle structure 161 that is rotatably connected to rear end portion of tubular housing 110.

Referring to the lower right portion of FIG. 1, tubular housing 110 is a molded plastic or folded metal box-like structure having a front end portion 111 defining a front opening 112, opposing side walls 113-1 and 113-2 and opposing upper and lower walls 114-1 and 114-2 extending from front end portion 111 and defining an elongated central cavity 115, and a substantially rectangular rear edge 116 that defines a rear opening 117 communicating with a back portion of central cavity 115.

Referring to the upper left portion of FIG. 1, sliding rack assembly 120 is disposed in tubular housing 110 such that sliding rack assembly 120 is slidable along a longitudinal axis X extending through elongated central cavity 115. Sliding rack assembly 120 generally includes a carrier 121 including a plastic carrier tray 122 and an elongated positioning rod 125 that extends from a rear portion of carrier tray 122 and is fixedly connected or integrally molded to a rear section of carrier tray 122. One or more positioning structures 127 (e.g., a knob) are disposed on a rear portion of positioning rod 125. At least one electronic device 140 is fixedly connected to the carrier (e.g., mounted on carrier tray 122), and a standard USB plug connector 150 is fixedly connected to a front end of carrier tray 122. Referring again to the bottom right portion of FIG. 1, plug connector 150 includes a substrate 151 having four of metal contacts 152 formed thereon, and a metal plug shell 155 that extends over substrate 151. Metal contacts 152 are shaped and arranged in a pattern established by the USB specification, and are electronically coupled to electronic device 140 according to known techniques.

Referring to both the upper and lower portions of FIG. 1, rear cap assembly 160 is connected to the rear edge of tubular housing 110 and includes a handle structure 161 that is disposed outside of tubular housing 110 (i.e., behind rear edge 116), and an actuator portion 165 that is disposed inside at least one of tubular housing 110 and handle structure 161. Handle structure 161 includes a box-like structure formed by side walls 163-1 and 163-2, upper wall 164-1 and lower wall 164-2, and is rotatably connected to tubular housing 110 such that side walls 163-1 and 163-2 and upper and lower walls 164-1 and 164-2 cover rear edge 116 of housing 110 in the opened and closed positions respectively shown in the upper and lower portions of FIG. 1. Actuator portion 165 is disposed either inside a space defined by side walls 163-1 and 163-2 and upper and lower walls 164-1 and 164-2, or extends into central cavity 115 of tubular housing 110.

According to an aspect of the present invention, actuator portion 165 is operably engaged with positioning structure 127, which is disposed on positioning rod 125, such that manual rotation of rear cap handle structure 161 relative to housing 110 around longitudinal axis X causes sliding rack assembly 120 to slide inside housing 110 between a retracted position, in which plug connector 150 is disposed inside of housing 110 (as shown in the upper left portion of FIG. 1), and a deployed position, in which plug connector 150 protrudes through and is exposed outside front opening 112 for operable coupling to a host system (as shown in the lower right portion of FIG. 1). As indicated in FIG. 1, this operable engagement is achieved by causing the one or more positioning structures 127 disposed on positioning rod 125 to slide along a curved surface 167 (e.g., a curved cam surface or a spiral groove) disposed on actuator portion 165. That is, the side and rectangular shape of sliding rack assembly 120 prevents its rotation inside tubular housing 110 when rear cap handle structure 161 is rotated relative to tubular housing 110, and cam surface/spiral groove 167 is fixedly connected to rear cap handle structure 161 such that cam surface/spiral groove 167 turns around central axis X when cap handle structure 161 is rotated relative to tubular housing 110. With this arrangement, rotation of rear cap handle structure 161 causes cam surface/spiral groove 167 to apply force on positioning rod 125 by way of positioning structure 127, thereby causing sliding rack assembly 120 to slide within housing 110. For example, USB device 100 is shown at the top left portion of FIG. 1 at a first time t1 (indicated by reference designation "100(t1)") in a fully retracted position (i.e., rear cap handle structure 161 is subject to 0° of rotation around longitudinal axis X), where positioning structures 127 engages a rearward portion of cam surface/spiral groove 167. Subsequent rotation of rear cap handle structure 161 around longitudinal axis X by a predetermined amount (e.g., either 90° in a clockwise direction, as indicated by the solid-line arrow in the middle of FIG. 1, or 90° in the counterclockwise direction, as indicated by the dashed-line arrow) while housing 110 maintained in a stationary position causes positioning structures 127 to slide onto a central portion of cam surface/spiral groove 167, thereby causing actuator portion 165 to push positioning rod 125 (shown in the upper left portion of FIG. 1) toward front wall (end portion) 111, whereby plug connector 150 partially protrudes through front opening 112. Further rotation of rear cap handle structure 161 around longitudinal axis X (e.g., either 180° in a clockwise direction, as indicated by the solid-line arrow in the lower right portion of FIG. 1, or 180° in the counterclockwise direction, as indicated by the dashed-line arrow) while housing 110 maintained in a stationary position causes positioning structures 127 to slide further onto a frontward portion of cam surface/spiral groove 167, thereby causing actuator portion 165 to further push positioning rod 125 toward front wall 111, whereby plug connector 150 is caused to fully deploy through front opening 112. As described below, subsequent rotation of rear cap handle structure 161 relative to housing 110 in either the clockwise/counterclockwise direction is performed to retract plug connector 150 back into housing 110. By providing such a lipstick-type actuating mechanism in which plug connector 150 is deployed and retracted by rotating rear cap handle structure 161 relative to housing 110, the present invention provides a convenient, reliable and easy to use retractable USB device that avoids fouling or jamming after repeated use by avoiding slots or other openings into the housing that are present in conventional pen-type retractable devices, and thereby avoiding the loss of valuable information by preventing failure of the USB device to deploy. In addition, by utilizing positioning rod 125 and positioning structure 127, which extends from the rear end of sliding rack assembly 120 and is operably engaged to cam surface/spiral groove 167 of actuating portion 165, the present invention provides a high quality retractable USB device that has a very low production cost, and provides a reliable deploying mechanism that allows a user to comfortably apply a greater actuating force than is possible using a conventional pen-type actuating mechanism.

According to another aspect of the present invention, rear cap 160 and housing 110 remain rotatably connected together at all times (i.e., such that rear cap 160 remains secured to housing 110 (a) at time t1 when plug connector 150 is in the retracted position shown at the upper left of FIG. 1, (b) in the deployed position when plug connector 150 extends through front opening 112 as shown in the lower right portion of FIG. 1, and (c) during movement of plug connector 150 between the deployed and retracted positions), thereby preventing loss of rear cap 160 during operation.

According to another aspect of the invention, the actuating mechanism is arranged such that rear cap 160 and housing 110 form substantially continuous surfaces when plug connector 150 is in the fully deployed and fully retracted positions. For example, as shown in the lower right portion of FIG. 1, when plug connector 150 is in the fully deployed position, side walls 163-1 and 163-2 of handle structure 161 respectively align with side walls 113-1 and 113-2, and opposing upper and lower walls 164-1 and 164-2 of handle structure 161 respectively align with upper/lower walls 114-1 and 114-2 of housing 110. This arrangement provides USB device 100 with an aesthetically pleasing appearance and facilitates comfortable storage in a user's pocket.

Various specific embodiments of the present invention will now be described with reference to FIGS. 2-16, where FIGS. 2-13 depict freely rotating embodiments of the present invention that utilize a biasing member (spring) to bias the sliding rack assembly inside the tubular housing, and FIGS. 14-17 describe another freely rotating embodiment of the present invention without using a spring to bias the sliding rack assembly. In the freely rotating embodiments, the actuator portion of the rear cap is engaged with positioning rod such that the rear cap handle structure is freely rotatable around the longitudinal axis relative to the housing, whereby the rear cap handle structure can be turned an unlimited number of full rotations in both the clockwise and counterclockwise directions relative to the tubular housing. In particular, the deploy/retract actuator is constructed such that, when the rotatable cap is rotated in a clockwise/counterclockwise direction until the plug connector is fully retracted or fully deployed, further rotation of the clockwise/counterclockwise direction is not impeded, thereby preventing damage to the deploy/retract actuator mechanism caused by over-rotation of the handle structure when the sliding rack assembly reaches the fully deployed or fully retracted positions inside the tubular housing.

Figure 2:
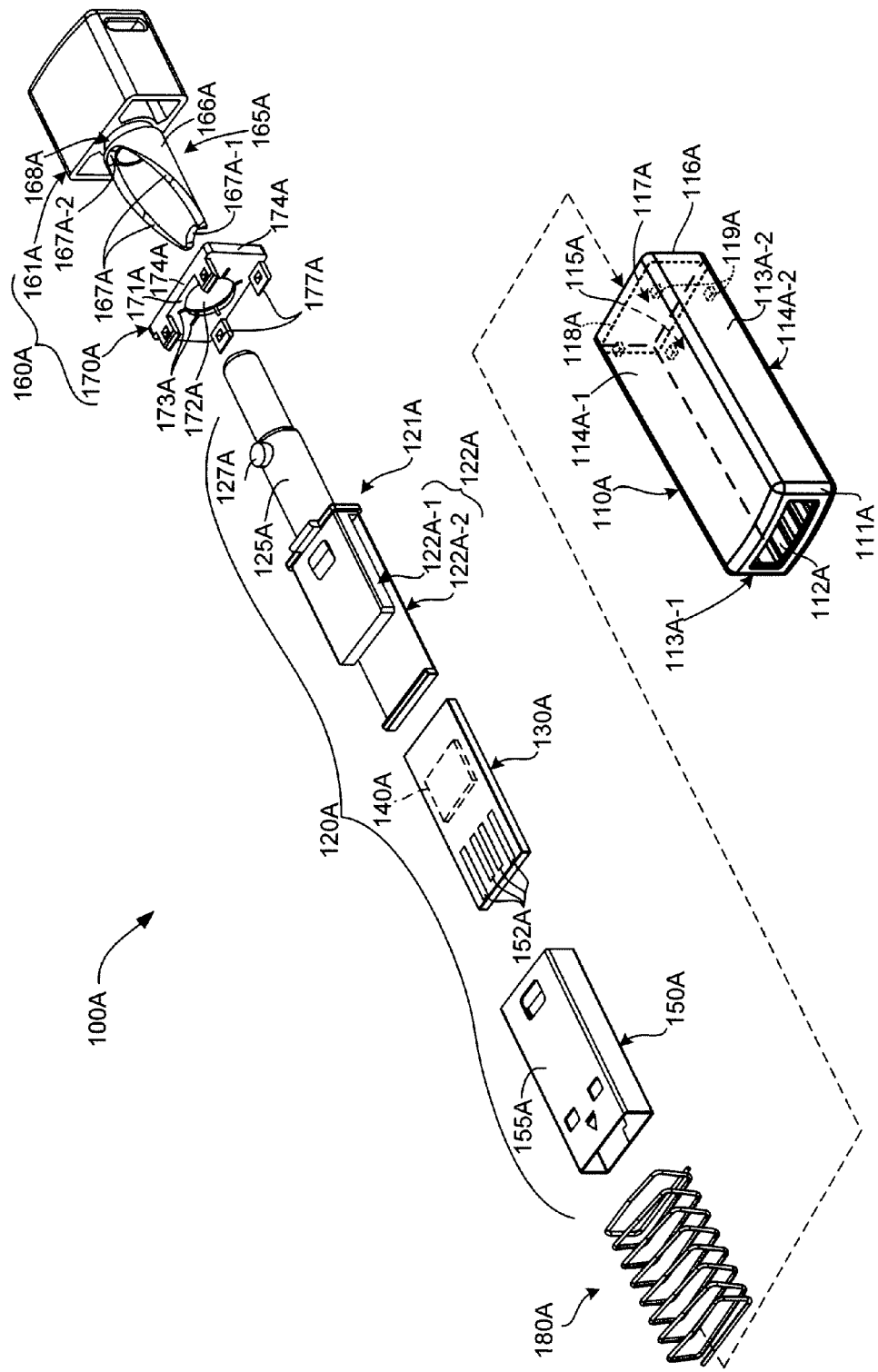
FIG. 2 is an exploded perspective view showing a USB device according to a first specific embodiment of the present invention.

FIG. 2 is an exploded perspective view showing a freely rotating lipstick-type USB device 100A according to a first specific embodiment of the present invention. USB device 100A generally includes a single-piece tubular housing 110A, a sliding rack assembly 120A, a rear cap assembly 160A, and a spring 180A.

Tubular housing 110A is a single-piece molded plastic structure having front end portion 111A that defines a front opening 112A, opposing side walls 113A-1 and 113A-2 and opposing upper and lower walls 114A-1 and 114A-2 that extend from front end portion 111A and defining an elongated central cavity portion 115A, and a rear edge 116A that surrounds and defines a rear opening 117A. A rectangular seat (recess) 118A is formed on a rear portion of tubular housing 110A around rear edge 116A for receiving a coupling structure (described below), and is shown in cross-section in FIG. 4. Four protrusions (first locking structures) 119A are disposed on an inside surface of tubular housing 110A and extends into elongated inner chamber 115A, and serves to secure the coupling structure in the manner described below.

Referring to the center of FIG. 2, sliding rack assembly 120A generally includes a carrier 121A, a molded, single piece chip-on-board (COB) type PCBA 130A, and an elongated metal connector plug shell 150A. Carrier 121A includes a plastic carrier tray 122A and an elongated positioning rod 125A that extends from a rear portion of carrier tray 122A and is fixedly connected or integrally molded to a rear section of carrier tray 122A. As described below, a positioning knob 127A is provided on positioning rod 125A to serve as part of an actuating mechanism. Carrier tray 122A includes an upper tray portion 122A-1 and a lower tray portion 122A-2 that form a clip-like structure for receiving and securing PCBA 130A. PCBA 130A includes standard USB metal contacts 152A formed on a first (e.g., upper) surface of a PCB, and IC components (e.g., flash memory chip 140A) mounted on the opposite (e.g., lower) surface of the PCB. A molded casing is then mounted or otherwise formed over the IC components (i.e., over the lower surface of the PCBA). The casing has a planar surface that is parallel to the PCB and extends along the entire length of the PCBA (e.g., from a front edge of the plug structure to a rear edge of the PCB). Accordingly, PCBA 130A is a flat, low-profile (thin) structure that can be easily incorporated into USB device 100A, e.g., using carrier 121A, by mounting PCBA 130A between upper tray portion 122A-1 and lower tray portion 122A-2 of carrier tray 122A. Plug connector 150A is fixedly connected to a front end of carrier tray 122A over PCBA 130A such that metal contacts 152A are exposed in a gap according to USB standards.

Referring to the right side of FIG. 2, rear cap assembly 160A includes a box-like rear cap handle structure 161A similar that described above, and an actuator portion 165A that is integrally molded with handle structure 161A and includes a hollow cylindrical wedge-shaped mounting structure 166A extending from handle structure 161A. As described below, wedge-shaped structure 166A includes a substantially oval cam surface 167A that cooperates with positioning knob 127A to serve as an actuating mechanism for deploying/retracting plug connector 150A. Cam surface 167A includes a front (first) locking groove 167A-1 and a rear (second) locking groove 167A-2 that serve to hold USB device 100A in the fully deployed and fully retracted positions, respectively, in the manner descried below. Finally, a neck-like bearing (locking) slot 168A is defined between hollow cylindrical wedge-shaped structure 166A and the handle portion of rear cap 160A, which serves to rotatably secure rear cap 160A to the housing in the manner described below.

According to an aspect of the present invention, rear cap assembly 160A further includes a "hidden" coupling structure (snap ring) 170A that serves to rotatably secure rear cap handle structure 161A to tubular housing 110A. In particular, as indicated in FIG. 2, coupling structure 170A includes a flat wall 171A defining a central opening 172A, where the peripheral edge 174A of flat wall 171A is sized to fit into seat 118A defined in tubular housing 110A. In addition, four (second) locking structures 177A protrude from rear wall 171A. A peripheral edge of central opening 172A is formed with a series of slits that allow a portion of flat wall 171A to bend in order to facilitate insertion of mounting structure 166A in the manner described below.

FIGS. 3(A) to 3(D) illustrate a simplified process for assembling USB device 100A according to an embodiment of the present invention.

Figure 3A:
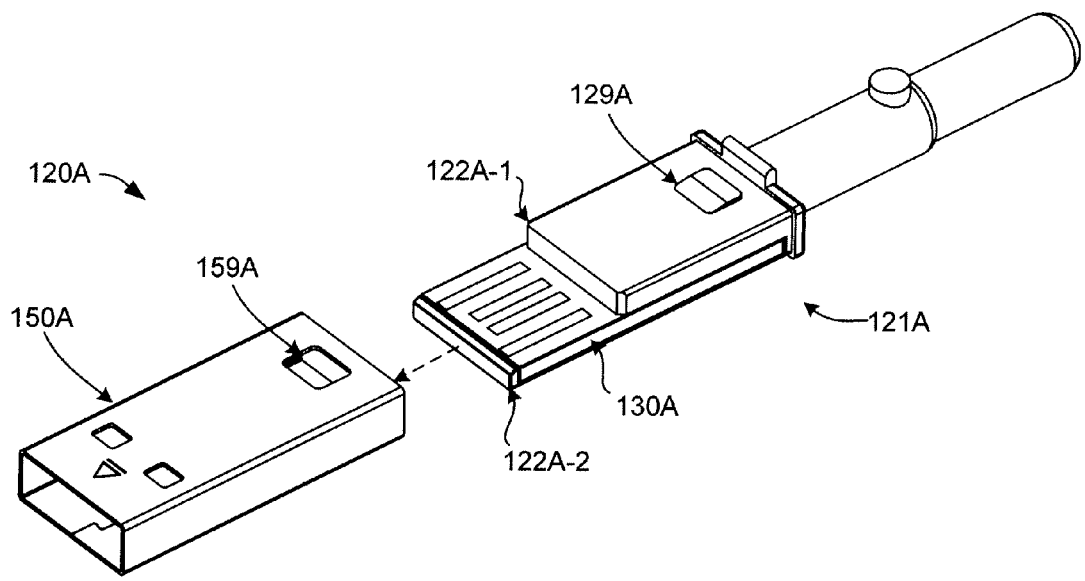
FIGS. 3(A), 3(B), 3(C) and 3(D) are exploded perspective views showing the USB device of FIG. 2 during assembly.

Referring to FIG. 3(A), sliding rack assembly 120A is assembled by mounting COB PCBA 130A between upper tray portion 122A-1 and lower tray portion 122A-2 of carrier 121A, and then this sub-assembly is inserted through a rear opening defined in plug connector 150A until a coupling structure 129A disposed on upper tray portion 122A-1 is received in a lock opening 159A defined in plug connector 150A.

Figure 3B:
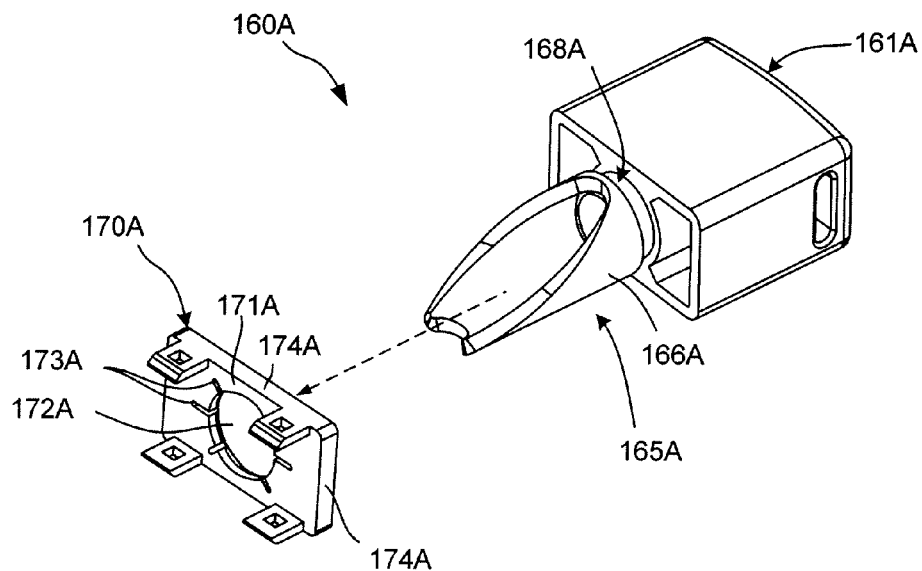

Referring to FIG. 3(B), rear cap assembly 160A is foamed by aligning wedge-shaped mounting structure 166A with central opening 172A defined in flat wall 171A, and then pushing handle structure 161A against coupling structure 170A. Because the flat wall 171A defines several slits 173A that extending radially outward from central opening 172A, portions of flat wall 171A temporarily bend inward (i.e., away from handle structure 161A) when wedge-shaped mounting structure 166A is pushed through the central opening 172A, thereby facilitating insertion of a corresponding mounting structure 166A disposed on a front portion of rear cap handle structure 161A. That is, the radial slits 173A allow temporary localized bending of flat wall 171A during the insertion process, and when mounting structure 166A clears the central opening, these portions then resiliently return to the planar shape of the flat wall 171A and engage with a bearing slot 168A formed on the handle structure, whereby the rear cap handle structure 161A is rotatably connected to the tubular housing 110A by way of the coupling structure 170A.

Figure 3C:
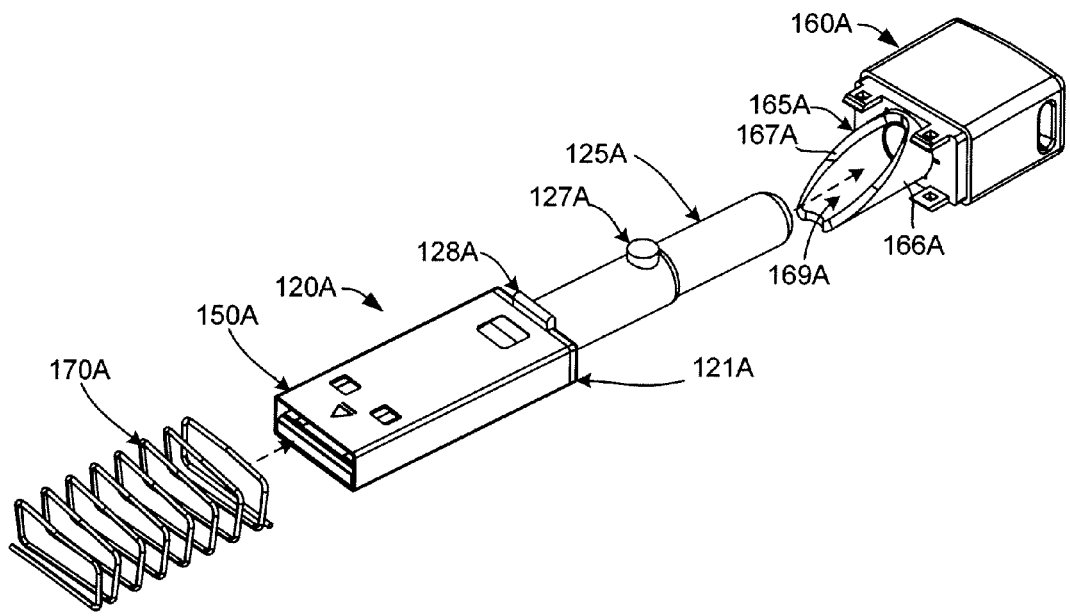

Referring to FIG. 3(C), positioning rod 125A is inserted into a hollow cylindrical central region 169A of wedge-shaped mounting structure 166A, and spring 180A is mounted over plug connector 150A of sliding rack assembly 120A until a rear end of spring 180A contacts a wall structure 128A that is integrally molded onto carrier 121A of rear cap assembly 160A. Note also that positioning knob 127A contacts substantially oval cam surface 167A when positioning rod 125A is inserted into hollow cylindrical central region 169A, thereby operably connecting sliding rack assembly 120A with rear cap assembly 160A. The completed sub-assembly formed by the operation shown in FIG. 3(C) is indicated on the right side of FIG. 3(D)).

Figure 3D:
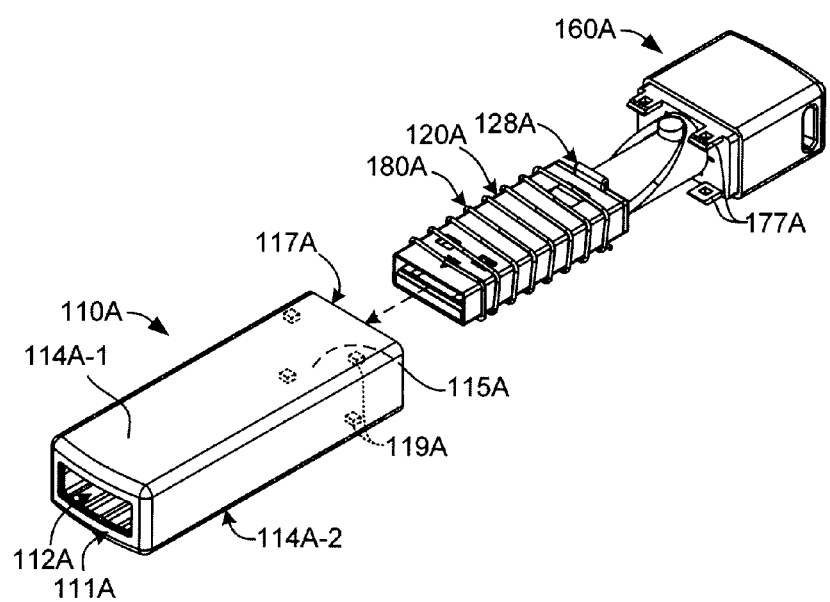
Figure 4:
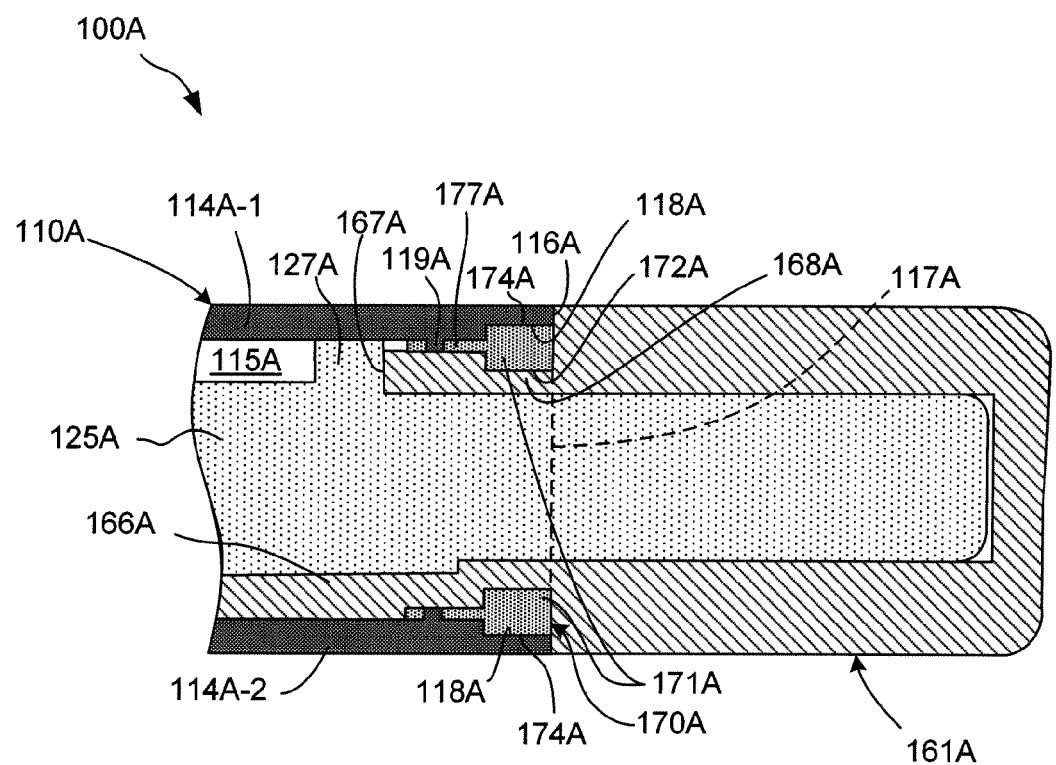
FIG. 4 is a simplified cross-sectional side view showing a portion of the USB device of FIG. 2.

Referring to FIGS. 3(D) and 4, the sub-assembly including sliding rack assembly 120A, spring 180A and rear cap assembly 160A are then inserted into tubular housing 110A through rear opening 117A until protrusions (first locking structures) 119A extending from inside surfaces of upper/lower walls 114A-1 and 114A-2 into central cavity 115A are snap-coupled into corresponding openings formed in (second) locking structures 177A, as shown in FIG. 4, thereby connecting rear cap assembly 160A to tubular housing 110A. Note that, upon assembly, spring 180A is maintained in position to bias sliding rack assembly 120A toward rear cap assembly 160A because the front end of spring 180A is held by front end portion 111A (i.e., the front end of spring 180A is too large to fit through front opening 112A), and the rear end of spring 180A is held by a wall structure 128A. Referring to FIG. 4, peripheral edge 174A of flat wall 171A of coupling structure 170A is sized to fit within seat 118A such that flat wall 171A aligns with rear edge 116A to essentially close off the rear opening 117A (indicated by dashed line) of tubular housing 110A. Note again that the peripheral edge of central opening 172A is engaged in bearing slot 168A such that handle structure 161A is rotatably connected to coupling structure 170A, and that mounting structure 166A extends into central cavity 115A of housing 110A. In addition, positioning rod 125A extends through the opening formed in mounting structure 166A and into a hollow region formed in handle structure 161A, with positioning knob 127A pressed against cam surface 167A.

Figure 5A:
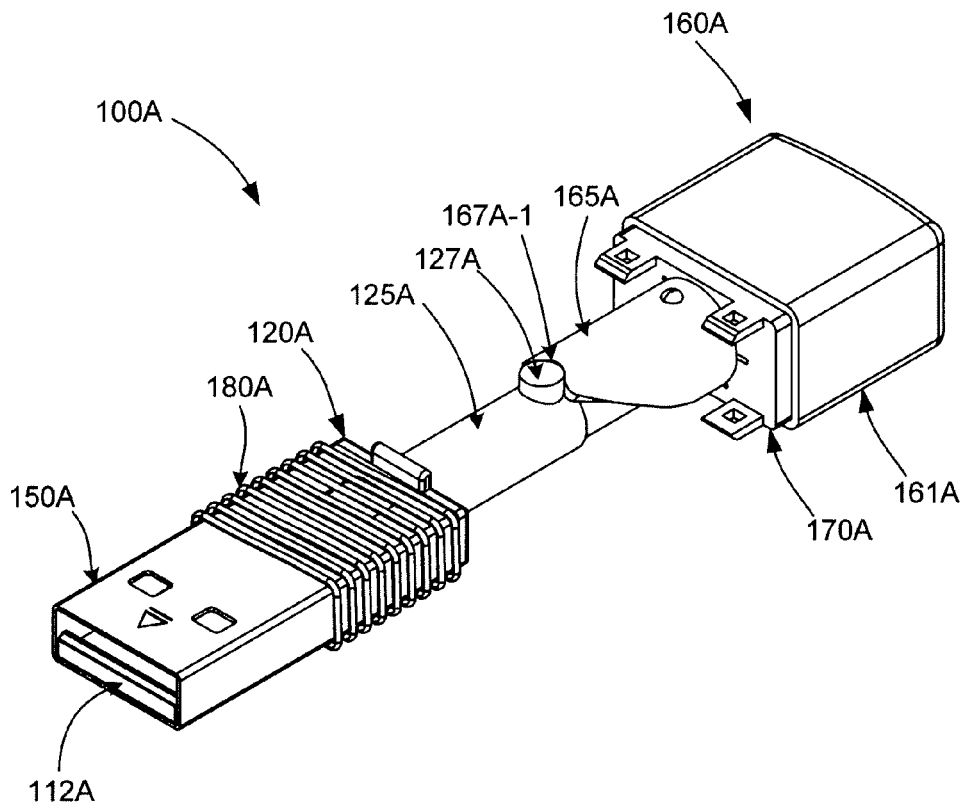
FIGS. 5(A) and 5(B) are partial perspective views showing the USB device of FIG. 2 during operation with the tubular housing removed for illustrative purposes.
Figure 5B:
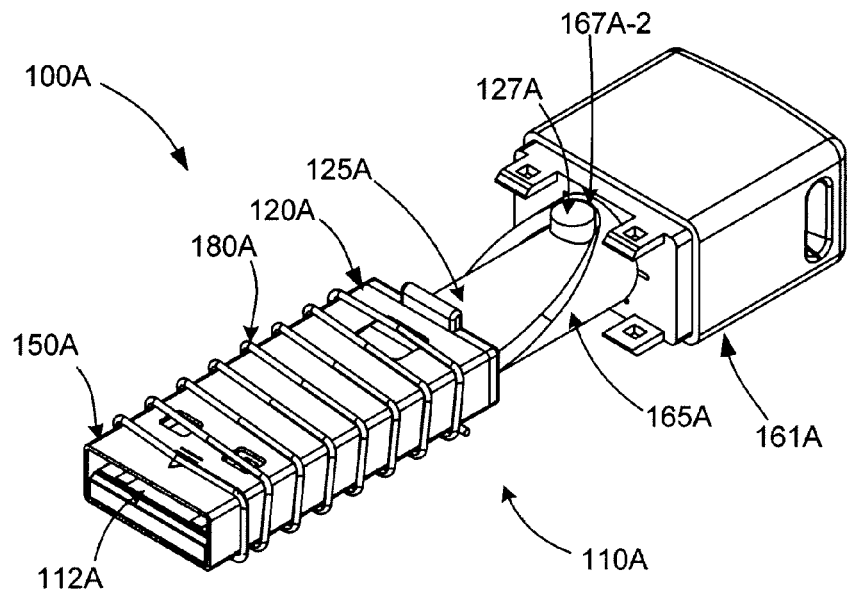

FIGS. 5(A) and 5(B) are partial perspective views showing USB device 100A with the tubular housing portion removed to better illustrate its operation. According to the present invention, actuator portion 165A is operably engaged with positioning rod 125A such that manual rotation of rear cap handle structure 161A relative to housing 110A causes sliding rack assembly 120A to slide inside housing 110A between the deployed position shown in FIG. 5(A) and the retracted position shown in FIG. 5(B). According to an aspect of the present embodiment, this actuation is achieved by contact between positioning knob 127A, which is fixedly mounted or integrally molded onto positioning rod 125A, and substantially oval cam surface 167A formed on hollow cylindrical wedge-shaped mounting structure 166A, which slidably extends through central opening 173A of coupling structure 170A. Note that spring 180A serves to bias sliding rack assembly 120 rearward (i.e., toward rear cap assembly 160A), whereby positioning knob 127A is maintained in reliable contact with cam surface 167A. Note also that, as indicated in FIG. 5(A), when handle structure 161A is rotated to push plug connector 150A into the deployed position, positioning knob 127A enters and is secured in front locking groove 167A-1, thereby maintaining the deployed position until the user applies sufficient torque to force positioning knob 127A out of front locking groove 167A-1 against the bias of spring 180A. Spring 180A thus biases positioning knob 127A into rear locking groove 167A-2, whereby USB device 100A is maintained in the retracted position until the user applies sufficient torque to force positioning knob 127A back into front locking groove 167A-1 against the bias of spring 180A.

Figure 6:
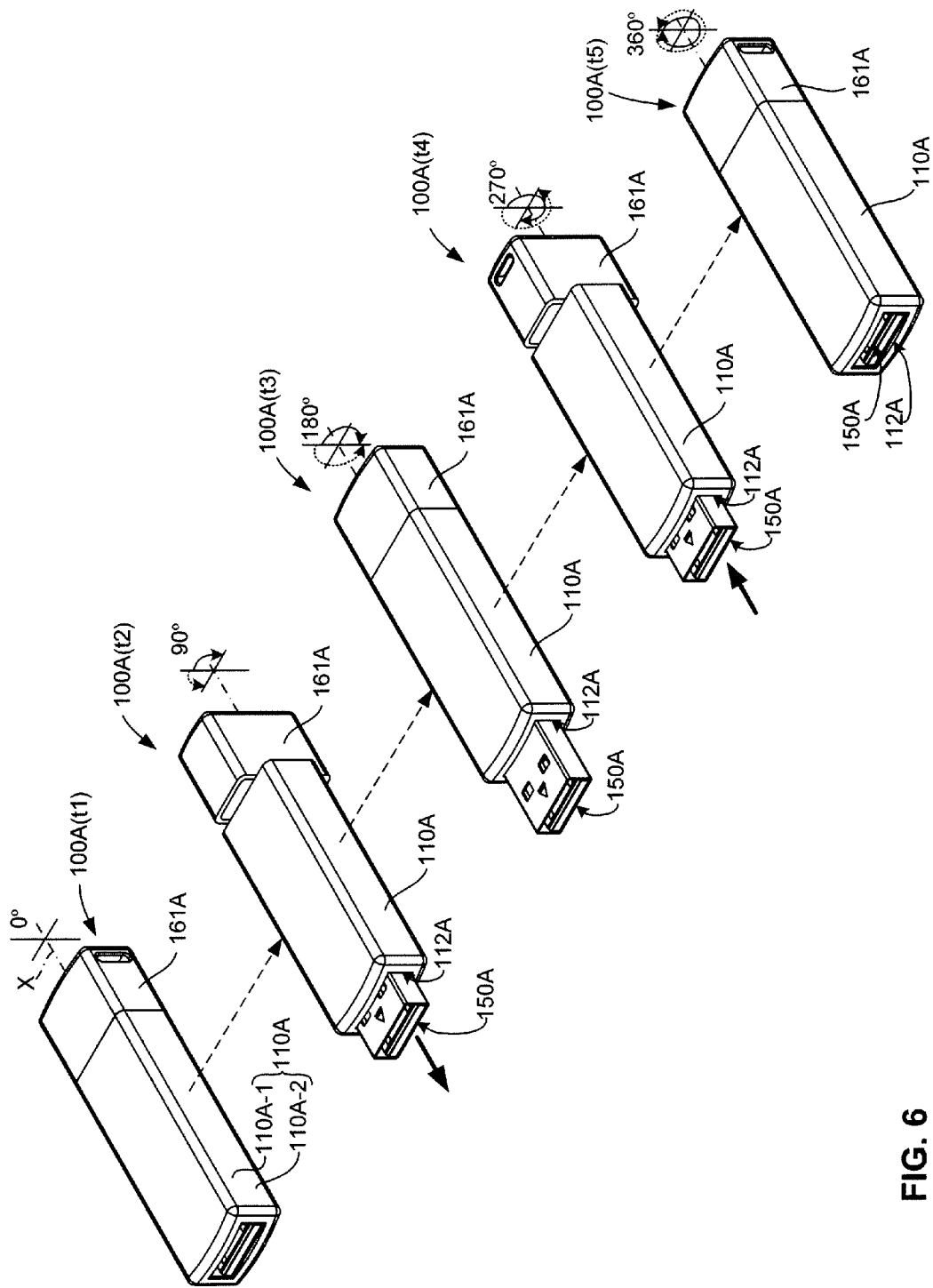
FIG. 6 includes sequential perspective views showing the USB device of FIG. 2 during operation.

FIG. 6 includes sequential perspective views showing USB device 100A during operation. As described with reference to FIGS. 5(A) and 5(B), the actuating mechanism of USB device 100A facilitates free rotation of rear cap handle structure 161A around longitudinal axis X relative to the housing 110A, whereby handle structure 161A can be turned an unlimited number of full rotations in both the clockwise and counterclockwise directions relative to the housing. For example, as illustrated in FIG. 6, USB device 100A(t1) is in the fully retracted position (i.e., handle structure 161A is subject to 0° of rotation around longitudinal axis X). Subsequent rotation of handle structure 161A around longitudinal axis X by a predetermined amount (e.g., 90°, as indicated by USB device 100A(t2) in FIG. 6) while housing 110A maintained in a stationary position causes the actuator portion 165A to push positioning rod 125A by way of contact between cam surface 167A and positioning knob 127A (shown in FIG. 5(B)) toward front end portion 111A, thereby causing plug connector 150A to partially protrude through front opening 112A. Further rotation of handle structure 161A around longitudinal axis X (e.g., 180°, as indicated by USB device 100A(t3) in the center of FIG. 6) while housing 110A maintained in a stationary position causes actuator portion 165A to further push positioning rod 125A forward, thereby causing positioning knob 127A to enter front locking groove 167A-1, as shown in FIG. 5(A), whereby plug connector 150A is maintained in the fully deployed position. According to the present embodiment, subsequent rotation of handle structure 161A around longitudinal axis X (e.g., 270°, as indicated by USB device 100A(t4) in FIG. 6) while housing 110A maintained in a stationary position causes positioning knob 127A to detach from front locking groove 167A-1 (see FIG. 5(A)), which causes spring 180A to push sliding rack assembly 120A back toward handle structure 161A. Finally, when rotation of handle structure 161A around longitudinal axis X completes a circle (e.g., 360°, as indicated by USB device 100A(t5) in FIG. 6), positioning knob 127A reaches rear locking groove 167A-2 (see FIG. 5(B)), which causes spring 180A to settle in the fully retracted position. As described above, the deploy/retract actuating mechanism is constructed such that, when handle structure 161A is rotated in a clockwise/counterclockwise direction until the plug connector is fully retracted or fully deployed, further rotation of the clockwise/counterclockwise direction is not impeded, thereby preventing damage to the deploy/retract actuator mechanism caused by over-rotation of handle structure 161A when sliding rack assembly 120A reaches the fully deployed or fully retracted positions inside housing 110A.

Figure 7:
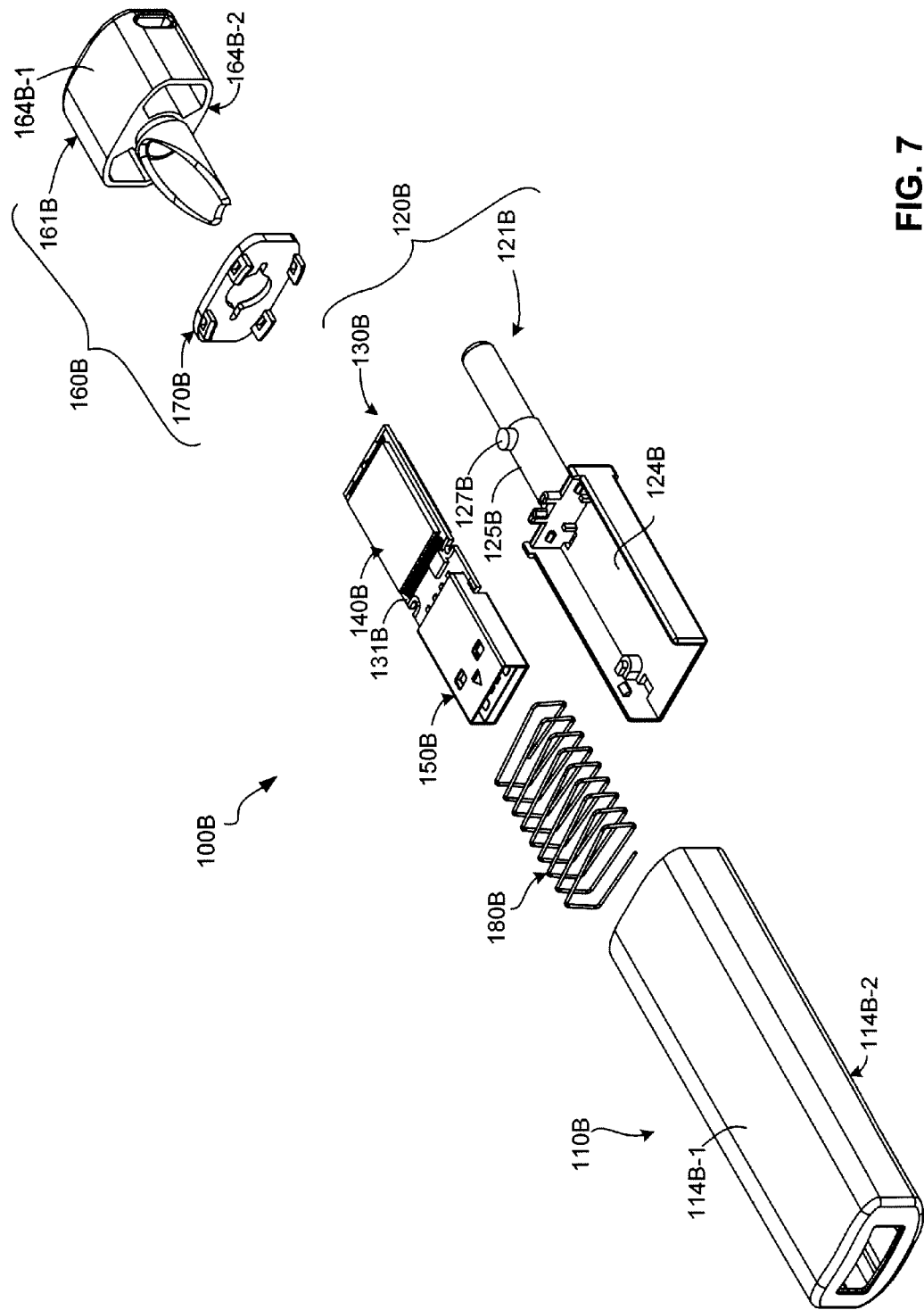
FIG. 7 is an exploded perspective view showing an exemplary USB device according to another specific embodiment of the present invention.

FIG. 7 is an exploded perspective view showing a freely rotating lipstick-type USB device 100B according to a second specific embodiment of the present invention. USB device 100B generally includes a housing 110B, a sliding rack assembly 120B, a spring 180B, and a rear cap assembly 160B. Similar to USB device 100A, sliding rack assembly 120B includes a carrier 121B that is slidably mounted inside tubular housing portion 110B and biased toward rear cap assembly 160B by spring 180B. Further, rear cap assembly 160B includes a handle structure 161B that is connected to housing 110B by way of a coupling structure 170B in a manner similar to that described above. In addition, carrier 121B of sliding rack assembly 120B includes a positioning rod 125B having a positioning knob 127B that is pressed against a substantially oval cam surface formed on rear cap handle portion 161B in the manner described above to deploy/retract a plug connector 150CB, which is disposed on the front end of sliding rack assembly 120B.

Figure 8A:
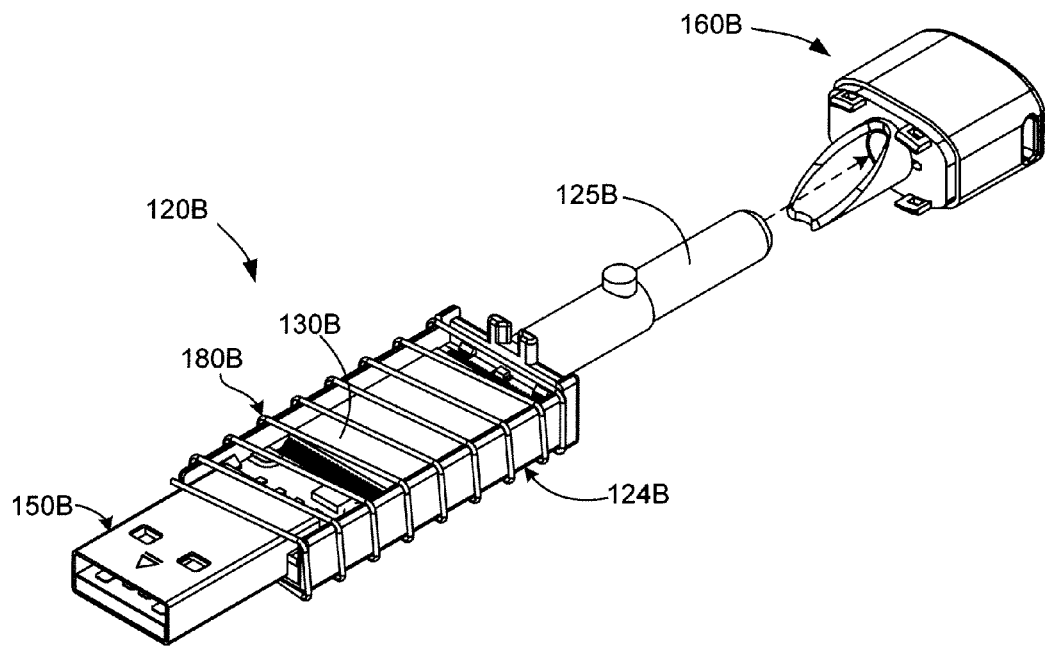
FIGS. 8(A) and 8(B) are perspective views showing a portion of the USB device of FIG. 7 during operation.
Figure 8B:
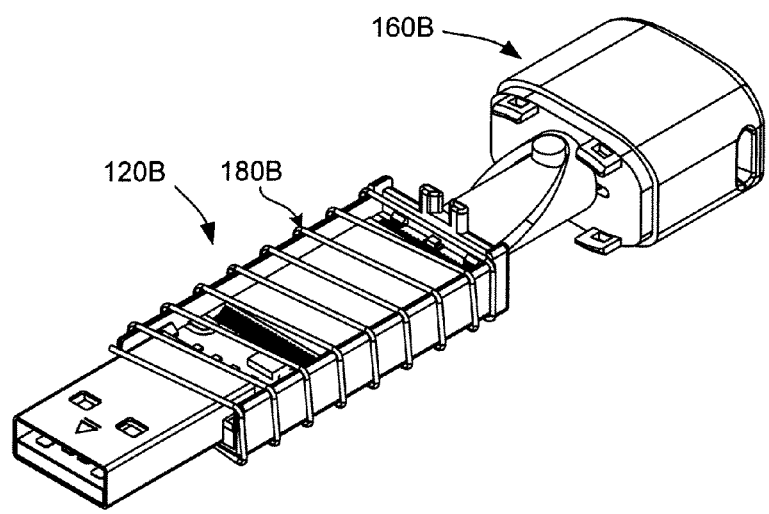

According to an aspect of the present embodiment, USB device 100B differs from USB device 100A in that sliding rack assembly 120B includes a standard printed circuit board assembly (PCBA) 130B in which various electronic devices (e.g., memory device 140B) are mounted onto a standard printed circuit board (PCB) 131B, and plug connector 150B is connected to a front end of PCB 131B using known techniques. In addition, carrier 121B includes integrally molded features that serve as an alignment and locking mechanism for securing PCBA 130B onto a lower wall 124B of carrier 121B, as shown in FIG. 8(A), such that PCBA 130B is prevented from contacting spring 180B during assembly with rear cap assembly 160B. The sub-assembly shown in FIG. 8(B) including sliding rack assembly 120B, rear cap assembly 160B and spring 180B is then mounted inside tubular housing 110B (shown in FIG. 7) in a manner similar to that described above with reference to USB device 100A.

Figure 9A:
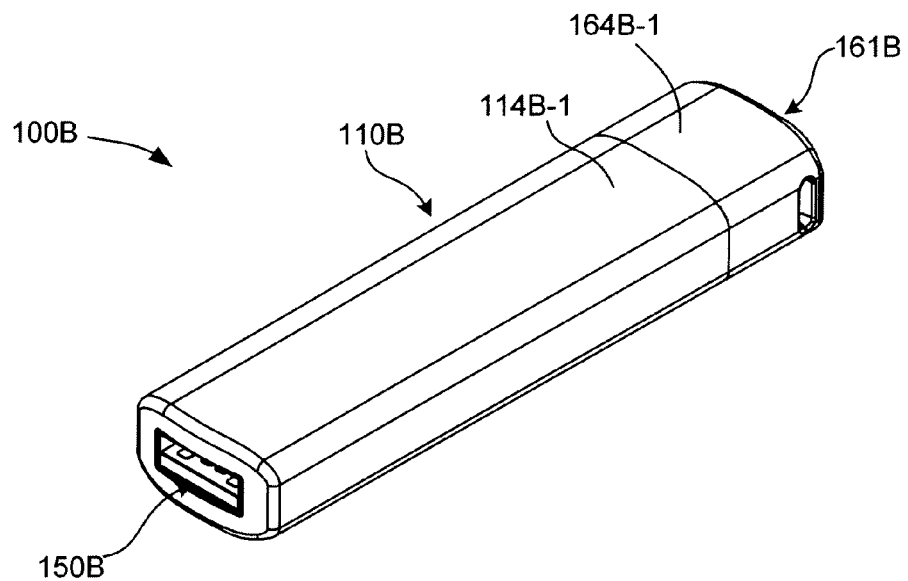
FIGS. 9(A) and 9(B) are assembled perspective views showing the USB device of FIG. 7 during operation.
Figure 9B:
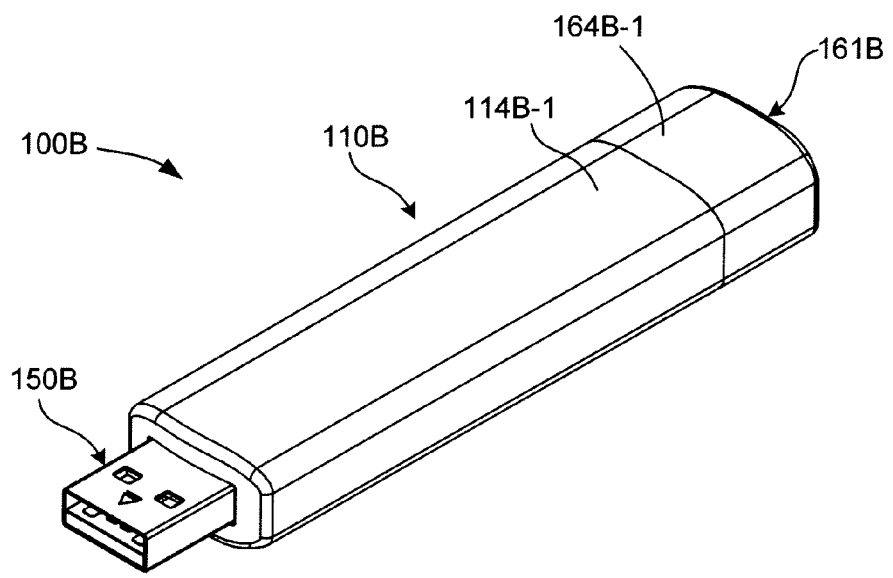

According to another aspect of the present embodiment, tubular housing 110B and handle portion 161B include matching outer wall surfaces that form continuous curved surfaces when plug connector 150B is in either of the fully deployed and fully retracted positions. Referring to FIG. 7, tubular housing 110B includes opposing upper and lower walls 114B-1 and 114B-2 that are respectively curved slightly outward, and handle structure 161B includes opposing upper and lower walls 164B-1 and 164B-2 whose curved shape matches that of tubular housing 110B. For example, as indicated in FIGS. 9(A) and 9(B), upper wall 114B-1 of housing 110B forms a continuous curved surface with upper wall 164B-1 of handle structure 161B when plug connector 150B is in either of the fully retracted position (shown in FIG. 9(A)) or the fully deployed position (shown in FIG. 9(B)). The outward curvature of the upper and lower walls of device 100B increases the structural strength of tubular housing 110B (e.g., its resistance to a crushing pressure) over the flat-walled design of the first embodiment, thus extending the average product life and facilitating lower manufacturing costs by utilizing less plastic. Referring again to FIG. 7, note that the outer shape of coupling structure 170B is also modified to match the curved shapes of upper and lower walls 164B-1 and 164B-2 of tubular housing 110B.

Figure 10:
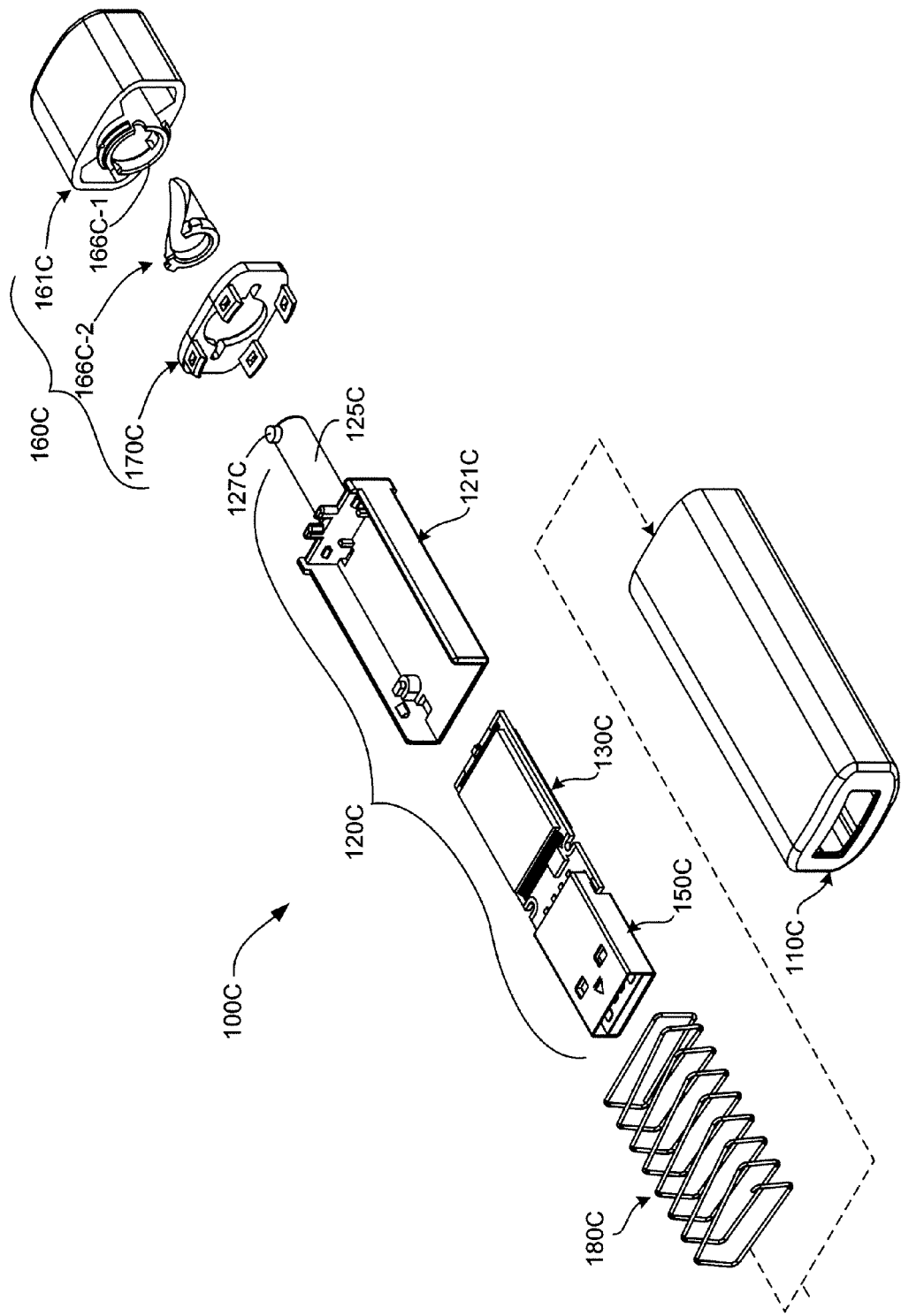
FIG. 10 is an exploded perspective view showing an exemplary USB device according to another specific embodiment of the present invention.

FIG. 10 is an exploded perspective view showing a freely rotating lipstick-type USB device 100C according to a third specific embodiment of the present invention. USB device 100C generally includes a tubular housing 110C, a sliding rack assembly 120C, and a spring 180C that are similar to that of the second embodiment. Similar to the USB device 100B, sliding rack assembly 120C includes a standard PCBA disposed on a carrier 121C that is slidably mounted inside tubular housing 110C, and is biased toward rear cap assembly 160C by spring 180C. In addition, carrier 121C has an integral positioning rod 125C including a positioning knob 127C that is biased against rear cap assembly 160C in the manner described above to deploy/retract a plug connector 150C, which is disposed on the front end of sliding rack assembly 120C.

Similar to the previously described embodiments, rear cap assembly 160C includes a handle structure 161C and a coupling structure 170C. However, according to an aspect of the present embodiment, USB device 100C differs from the previously described USB devices in that rear cap assembly 160C also includes a separately molded rotary sleeve 166C-2 that is snap-coupled inside a hollow cylindrical mounting structure 166C-1, which is integrally molded to and disposed inside handle structure 161C. With this arrangement, as indicated in FIG. 11(A), actuator portion 165C is formed by both hollow cylindrical mounting structure 166C-1, which includes a first cam surface portion 167C-1 similar to that described above formed on an inside surface thereof, and rotary sleeve 166C-2, which includes a second cam surface portion 167C-2 that serves to reliably guide positioning rod 125C (e.g., to prevent positioning rod 125C from swinging) during rotation of rear cap handle portion 161C relative to housing 110C.

Figure 11A:
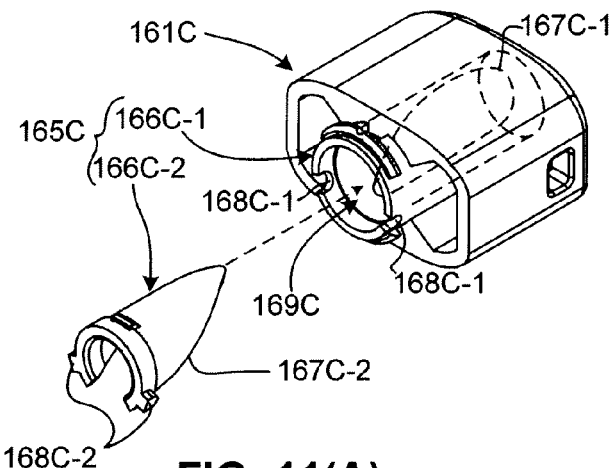
FIGS. 11(A), 11(B) and 11(C) are perspective views showing a rear cap assembly of the USB device of FIG. 10 during assembly.
Figure 11B:
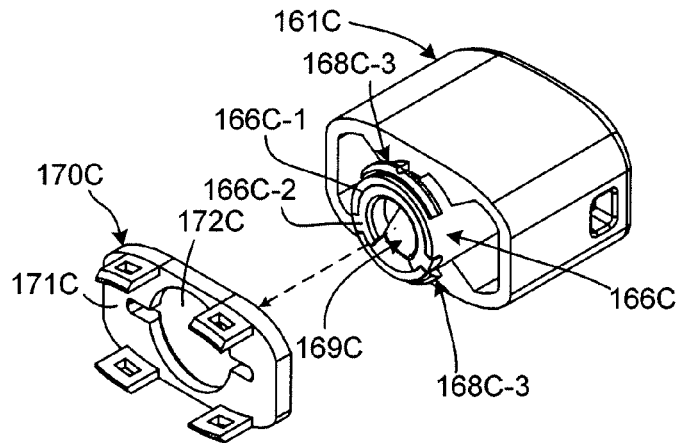
Figure 11C:
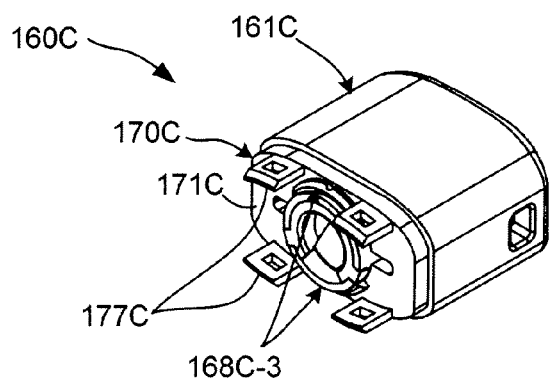

FIGS. 11(A) to 11(C) illustrate the assembly of rear cap assembly 160C. Referring to FIG. 11(A), rotary sleeve 166C-2 is inserted into a hollow cylindrical central region 169C defined by mounting structure 166C-1 until tabs 168C-2 are snap-coupled into corresponding notches 168C-1 defined at a front portion of mounting structure 166C-1, thereby securing rotary sleeve 166C-2 to handle structure 161C. Referring to FIG. 11(B), with rotary sleeve 166C-2 inserted into hollow cylindrical central region 169C, the front portion of mounting structure 166C-1 is inserted into central opening 172C until locking ribs 168C-3 pass entirely through flat wall 171C, whereby portions of flat wall 171C resiliently return to their original planar shape to rotatably secure rotary sleeve 166C-2 to handle structure 161C, as shown in FIG. 11(C). The completed rear cap assembly 160C shown in FIG. 11(C) is then ready for connection to the tubular housing by way of locking structures 177C in the manner described above.

Figure 12:
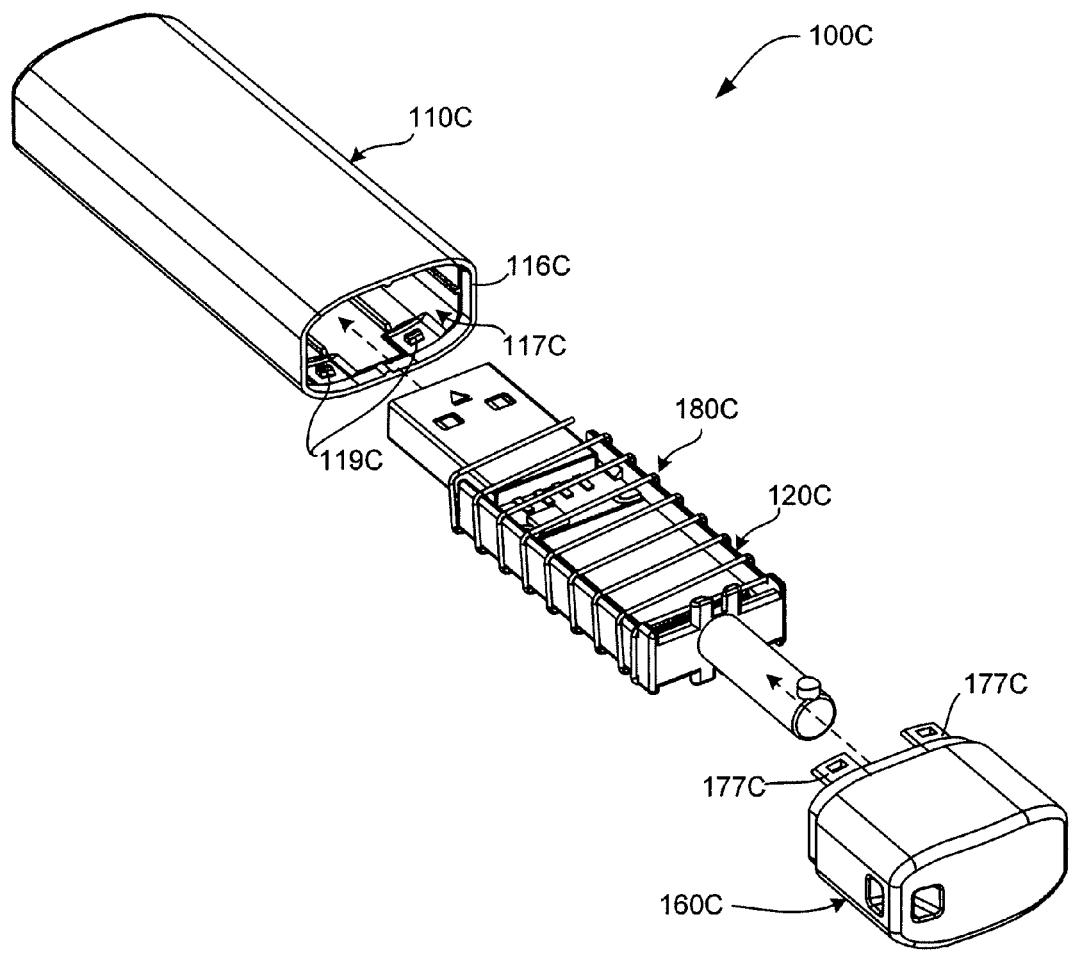
FIG. 12 is an exploded perspective rear view showing the USB device of FIG. 10 during assembly.

FIG. 12 is a rear top perspective view depicting the insertion of the sub-assembly including sliding rack assembly 120C and spring 180C through rear opening 117C of tubular housing 110C, and the subsequent connection of rear cap assembly 160C onto rear edge 116C of tubular housing 110C. FIG. 12 shows two of the four locking structures 119C disposed on the inside surface of tubular housing 110C that engage with locking structures 177C to complete the assembly process in a manner similar to that described in the embodiments above.

Figure 13A:
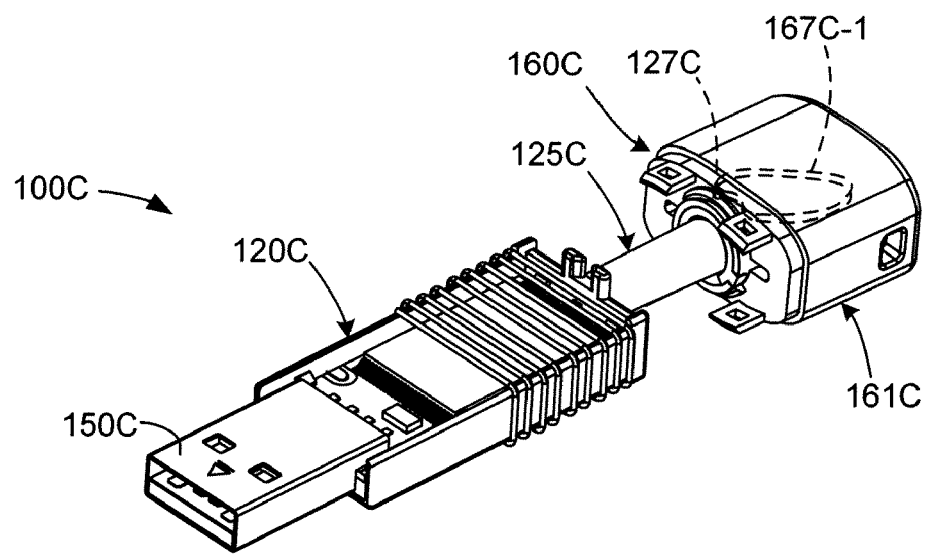
FIGS. 13(A) and 13(B) are partial perspective views showing the USB device of FIG. 10 during operation with the tubular housing removed for illustrative purposes
Figure 13B:
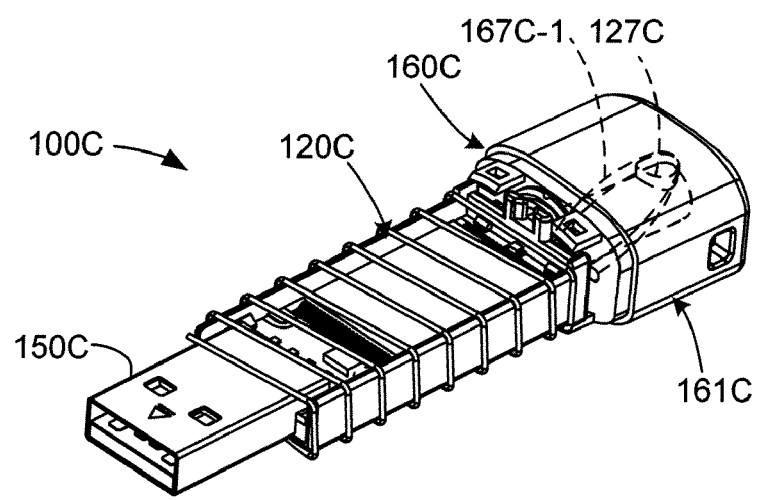

FIGS. 13(A) and 13(B) are partial perspective views showing portions of USB device 100C with the tubular housing removed to better illustrate the device operation. As illustrated in FIGS. 13(A) and 13(B), substantially oval cam surface 167C-1 serves to position sliding rack assembly 120C in a manner similar to that described above with reference to USB device 100A, wherein positioning knob 127C slides along cam surface 167C-1 inside rear cap handle structure 161C in response to rotation of handle structure 161C relative to the housing (not shown), thereby positioning sliding rack assembly 120C by way of positioning rod 125C. Note that substantially oval cam surface 167C-1 includes a front locking groove that receives positioning knob 127C to maintain plug connector 150C in the deployed position (see FIG. 13(A)) and a rear locking groove that maintains plug connector 150C in the retracted position (see FIG. 13(B)) in the manner described above. An advantage of this embodiment is that the overall length of USB device 100C may be made shorter than that of the previous embodiments.

Figure 14:
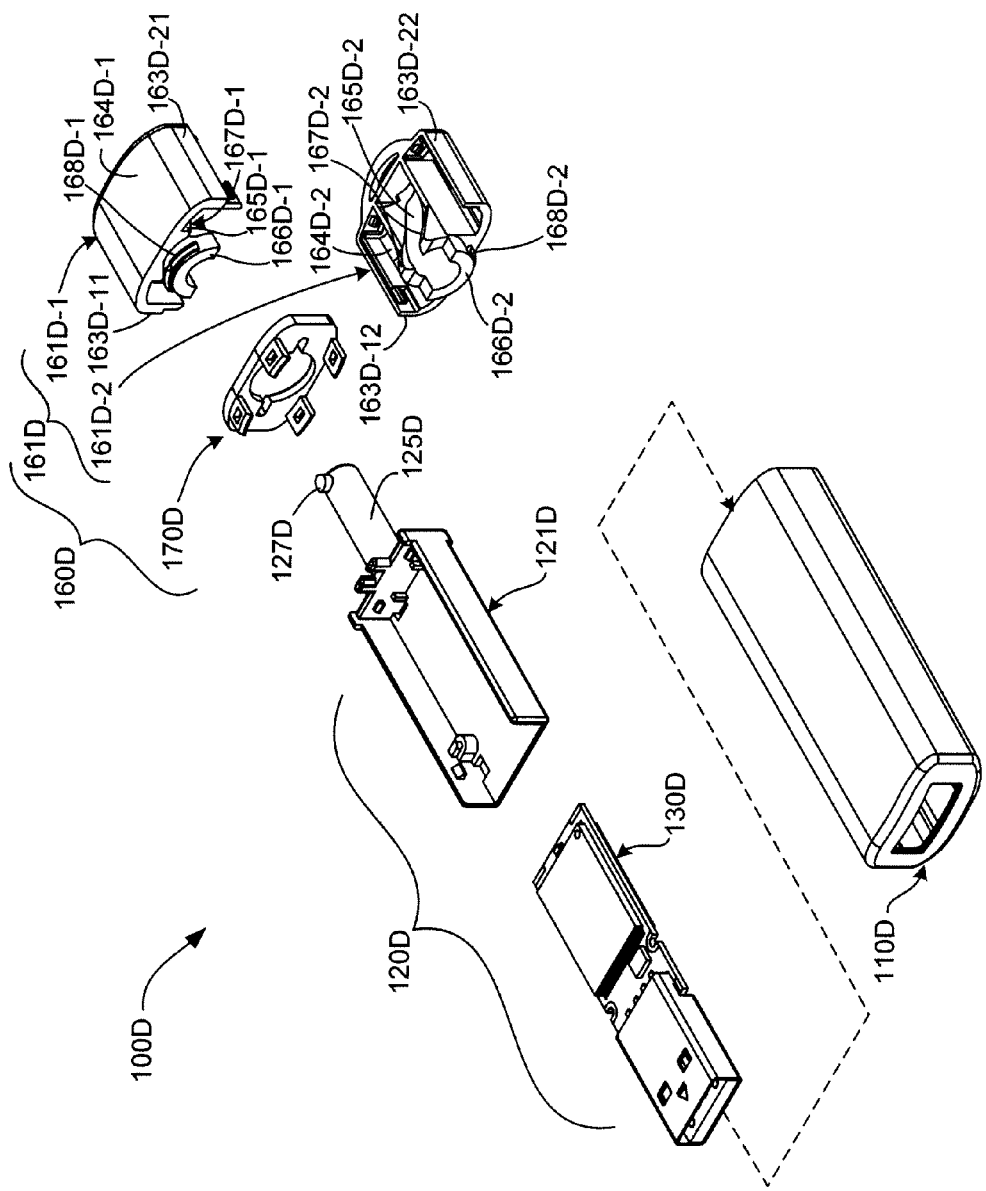
FIG. 14 is an exploded perspective view showing an exemplary USB device according to another specific embodiment of the present invention.

FIG. 14 is an exploded perspective view showing a freely rotating lipstick-type USB device 100D according to a fourth specific embodiment of the present invention. USB device 100D generally includes a tubular housing 110D, a sliding rack assembly 120D, and a rear cap assembly 160D. Similar to the USB device 100C, sliding rack assembly 120D includes a standard PCBA and is slidably mounted inside tubular housing 110D. In addition, sliding rack assembly 120D includes a carrier tray 121D having a positioning rod 125D including a positioning knob 127D that is engaged inside rear cap assembly 160D in a manner similar to that described above with reference to device 100C to deploy/retract a plug connector 150D, which is disposed on the front end of sliding rack assembly 120C.

According to an aspect of the present embodiment, USB device 100D differs from the previously described USB devices in that it does not utilize a spring to bias sliding rack assembly 120D in the manner described above. Instead, USB device 100D is characterized in that rear cap assembly 160D includes, in addition to a coupling structure 170D similar to that described above, a two-part handle structure 161D that forms an oval cam channel in which positioning knob 127D is restricted to reside during the deploying and retracting operations. In particular, two-part handle structure 161D includes an upper (first) handle portion 161D-1 and a lower (second) handle portion 161D-2. Upper handle portion 161D-1 includes upper wall 164D-1 and side wall portions 163D-11 and 163D-21, and lower handle portion 161D-2 includes lower wall 164D-2 and side wall portions 163D-12 and 163D-22, where these wall portions are shaped and sized such that they form a box-like enclosure similar to that described above when operably connected. In addition, upper handle portion 161D-1 includes a first actuator portion 165D-1 having a first hollow semi-cylindrical structure portion 166D-1 including a first cam surface portion 167D-1 formed thereon, and lower handle portion 161D-2 includes a second actuator portion 165D-2 having a second hollow semi-cylindrical structure portion 166D-2 including a second cam surface portion 167D-2 formed thereon. Upper handle portion 161D-1 and lower handle portion 161D-2 are formed such that, when operably mounted on each other, a substantially uniform gap separating the cam surface portions 167D-1 and 167D-2 forms the oval cam channel used to slidably push/pull positioning knob 127D when two-part handle structure 161D is rotated relative to tubular housing 110D during the deploying and retracting operations. That is, instead of using a spring to bias positioning knob 127D against a single cam surface, a pushing force is applied to positioning knob 127D during the deploying operation by one of cam surface portions 167D-1 and 167D-2, and a pulling force is applied to positioning knob 127D during the retracting operation by the other of cam surface portions 167D-1 and 167D-2.

Figure 15A:
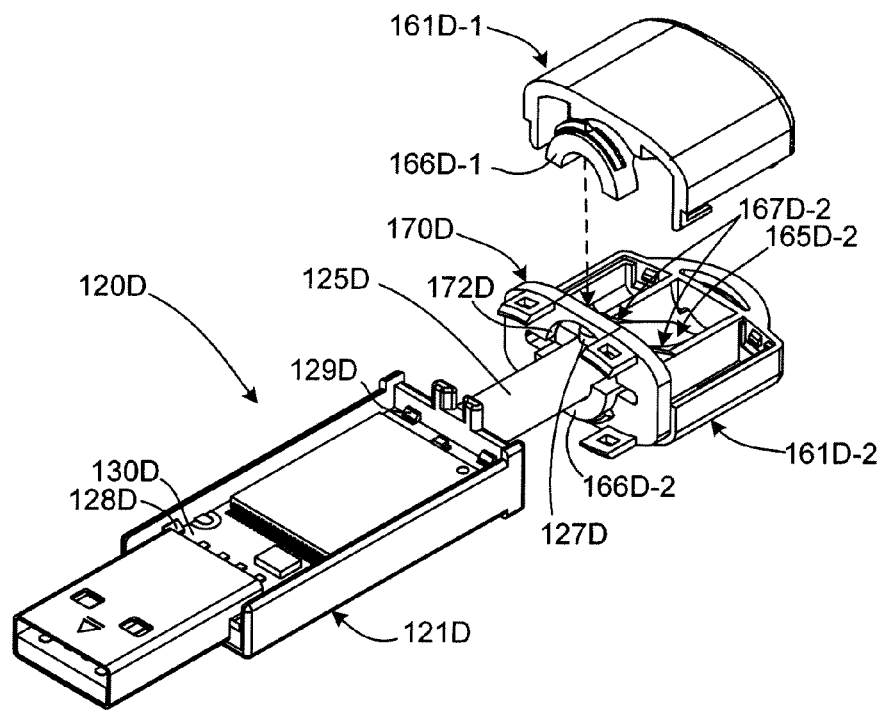
FIGS. 15(A) and 15(B) are partial exploded perspective views showing a portion of the USB device of FIG. 14.

FIG. 15(A) illustrates a portion of the process utilized to assemble USB device 100D according to an embodiment of the present invention. First, sliding rack assembly 120D is assembled in a manner similar to that utilized in the previously described embodiments (e.g., by snap-coupling connecting PCBA 130D to carrier 121D by way of fasteners 128D and 129D, as shown). Next, coupling structure 170D is positioned next to lower handle portion 161D-2 such that a neck-liked locking rib 168D-2 is located adjacent to opening 172D. Next, sliding rack assembly 120D is mounted on lower handle portion 161D-2 such that rod 125D extends through opening 172D and positioning knob 127D is disposed over lower handle portion 161D-2. Next, upper handle portion 161D-1 is mounted onto lower handle portion 161D-2 such that snap-coupling structures formed on upper handle portion 161D-1 are engaged with corresponding snap coupling structures disposed on lower handle portion 161D-2 in the manner indicated in FIG. 16. The front ends of semi-cylindrical structure portions 166D-1 and 166D-2 are then inserted into opening 172D to secure upper handle portion 161D-1 and lower handle portion 161D-2 to coupling structure 170D in a manner similar to that described above. Finally, the sub-assembly shown in FIG. 15(A) is inserted into tubular housing 110D using the methods described above to provide the fully assembled USB device 110D shown in FIG. 16.

Figure 15B:
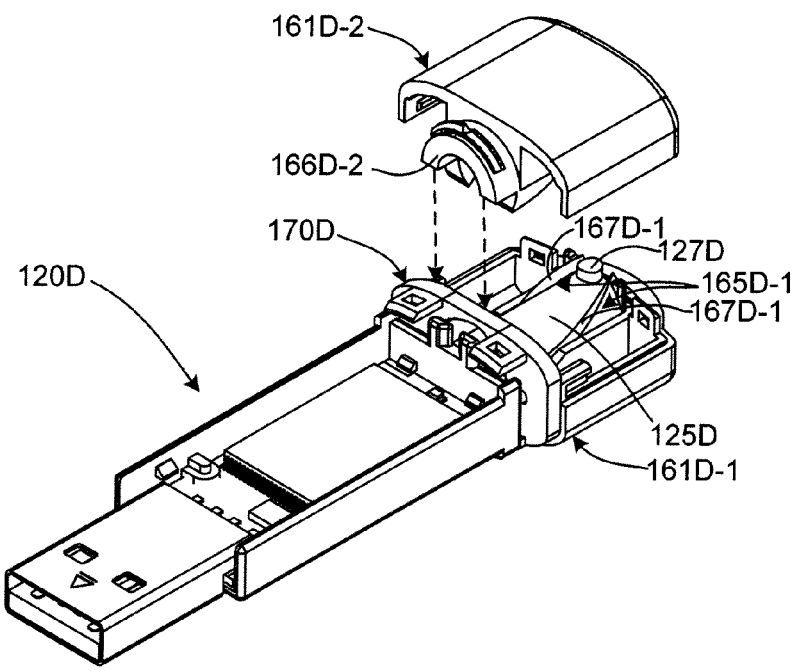
Figure 16:
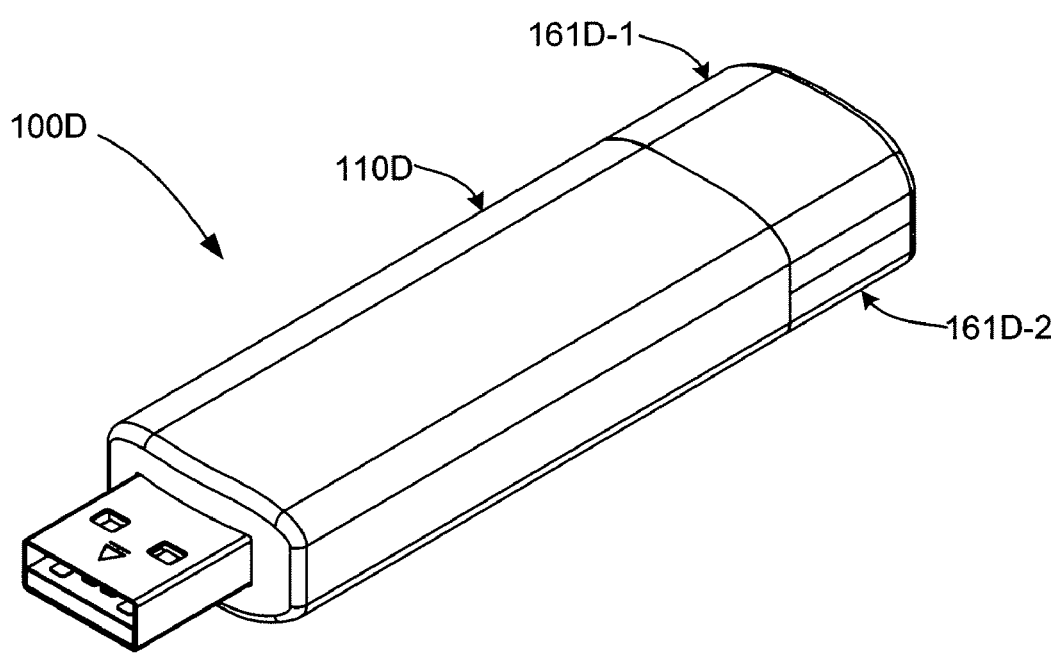
FIG. 16 is an assembled perspective showing the USB device of FIG. 14.

FIG. 15(B) shows the same structures included in FIG. 15(A), but depicts an alternative assembly process in which coupling structure 170D is connected to upper handle portion 161D-1, then sliding rack assembly 120D is mounted such that positioning knob 127D is disposed between opposing curved portions of second actuator portion 165D-2, and then lower handle portion 161D-2 is snap-coupled onto upper handle portion 161D-1 in the manner described above. FIG. 15(B) also differs from FIG. 15(A) in that FIG. 15(B) shows the position of positioning knob 127D after the handle structure is rotated 180° from the position shown in FIG. 15(A) (i.e., FIG. 15(A) shows the position of rod 125D when sliding rack assembly 120D is in the deployed position, and FIG. 15(B) shows the position of rod 125D when sliding rack assembly 120D is in the retracted position). Note that FIGS. 15(A) and 15(B) respectively show cam surface portions 167D-1 and 167D-2, and in particular exemplary surface shapes that produce the desired oval cam channel used to slidably push/pull positioning knob 127D when two-part handle structure 161D is rotated relative to tubular housing 110D during the deploying and retracting operations.

Although the present invention has been described with respect to certain specific embodiments, it will be clear to those skilled in the art that the inventive features of the present invention are applicable to other embodiments as well, all of which are intended to fall within the scope of the present invention. For example, those skilled in the art will recognize that each of USB devices may be modified to implement other PCBA types (e.g., surface mount technology (SMT)-type USB PCBAs). In addition, the various device structures may be modified to implement other types of portable computer peripheral apparatus, for example, by modifying the plug connector to include an interface circuit and plug structure that supports Secure Digital (SD), Micro SD, Multi-Media Card (MMC), Compact Flash (CF), Memory Stick (MS), PCI-Express, a Integrated Drive Electronics (IDE), Serial Advanced Technology Attachment (SATA), external SATA, Radio Frequency Identification (RFID), fiber channel and optical connection protocols. Also, the tubular housing structure is not limited to an integrally molded tubular housing structure, but may comprise a two-part housing assembly (e.g., including a top housing and bottom housing) that are fixedly connected to each other by a snap coupling mechanism or ultrasonic welding around edges of top and bottom housing.

The invention claimed is:

1. A lipstick-type portable computer peripheral apparatus comprising:
   a single-piece tubular housing having a front end portion defining a front opening, opposing side walls and opposing upper and lower walls extending from the front end portion and defining an elongated central cavity, and a rear edge disposed at a back portion of the central cavity and defining a rear opening;
   sliding rack assembly movably disposed in the tubular housing such that the sliding rack assembly is slidable along a longitudinal axis extending through the elongated central cavity, the sliding rack assembly including:
      a carrier including a carrier tray and an elongated positioning rod extending from a rear portion of the carrier tray and a positioning structure disposed on the positioning rod;

at least one electronic device fixedly connected to the carrier; and
a plug connector mounted on the carrier and disposed at a front end of the sliding rack assembly; and
a rear cap assembly connected to the rear edge of the tubular housing, the rear cap assembly including a handle structure that is disposed outside of the tubular housing and an actuator portion disposed inside one of the tubular housing and the handle structure, the actuator portion being operably engaged with the positioning structure such that manual rotation of the handle structure relative to the tubular housing around the longitudinal axis causes the sliding rack assembly to slide inside the tubular housing between a retracted position in which said plug connector is disposed inside of the tubular housing, and a deployed position in which said plug connector is exposed outside said front opening for operable coupling to a host system.

2. The lipstick-type portable computer peripheral apparatus according to claim 1,
wherein the positioning structure comprises one or more positioning knobs disposed on the positioning rod,
wherein the actuator portion of the rear cap assembly includes one of a curved cam surface and a spiral groove, and
wherein the positioning knob is operably engaged with said one of said curved cam surface and said spiral groove such that the positioning knob remains in contact with said one of said curved cam surface and said spiral groove while manual rotation of the handle structure relative to the tubular housing causes the sliding rack assembly to slide between the retracted position and the deployed position.

3. The lipstick-type portable computer peripheral apparatus according to claim 1, wherein the handle structure of the rear cap assembly further comprises opposing upper and lower walls are shaped such that the upper and lower walls of the handle structure are respectively aligned with the opposing upper and lower walls of the tubular housing when the plug connector is in both the fully deployed and fully retracted positions.

4. The lipstick-type portable computer peripheral apparatus according to claim 1, wherein the opposing upper and lower walls of the handle structure and the opposing upper and lower walls of the tubular housing comprise planar surfaces arranged such that the upper and lower walls of the rear cap assembly form coplanar surfaces with the opposing upper and lower walls of the tubular housing when the plug connector is in both the fully deployed and fully retracted positions.

5. The lipstick-type portable computer peripheral apparatus according to claim 1, wherein the opposing upper and lower walls of the handle structure and the opposing upper and lower walls of the tubular housing comprise curved surfaces shaped and arranged such that the upper and lower walls of the rear cap assembly form continuous curved surfaces with the opposing upper and lower walls of the tubular housing when the plug connector is in both the fully deployed and fully retracted positions.

6. The lipstick-type portable computer peripheral apparatus according to claim 1,
wherein the rear edge of the tubular housing defines a seat,
wherein the tubular housing includes a plurality of first locking structures disposed inside the elongated inner chamber,
wherein the rear cap assembly further includes a coupling structure having a flat wall and a plurality of second locking structures that protrude from the flat wall, the flat wall having a peripheral edge that is sized to fit inside the seat, and each of the plurality of second locking structures being fixedly connected to an associated one of the plurality of first locking structures, and
wherein the handle structure is rotatably connected to the coupling structure.

7. The lipstick-type portable computer peripheral apparatus according to claim 6,
wherein the handle structure of the rear cap assembly includes a mounting structure,
wherein the coupling structure defines a central opening and multiple slits extending radially outward from the central opening, and
wherein the handle structure is rotatably mounted onto the coupling structure such that the mounting structure extends through the central opening.

8. The lipstick-type portable computer peripheral apparatus according to claim 1, further comprising a resilient member disposed in the tubular housing such that the resilient member biases the sliding rack assembly along the longitudinal axis.

9. The lipstick-type portable computer peripheral apparatus according to claim 1, wherein said actuator portion is engaged with said positioning structure such that the handle structure of the rear cap assembly is freely rotatable around the longitudinal axis relative to the housing.

10. The lipstick-type portable computer peripheral apparatus according to claim 9,
wherein the positioning structure comprises one or more positioning knobs disposed on the positioning rod,
wherein the actuator portion includes a substantially oval cam surface, and
wherein the apparatus further comprises a resilient member operably disposed in the housing to bias the sliding rack assembly toward the rear cap assembly such that the one or more positioning knobs are slidably pressed against the cam surface, whereby the force exerted on the positioning knobs by the cam surface while the handle structure is rotated relative to the tubular housing causes displacement of the sliding rack assembly inside the tubular housing along the longitudinal axis.

11. The lipstick-type portable computer peripheral apparatus according to claim 10, wherein the substantially oval cam surface includes a first locking groove and a second locking groove, the first locking groove being disposed on the substantially oval cam surface at a position closer to the resilient member than that of the second locking groove, whereby when the handle structure is rotated relative to the tubular housing such that the positing knob enters the first locking groove, the sliding rack assembly is stably maintained in the deployed position, and when the handle structure is rotated relative to the tubular housing such that the positing knob enters the second locking groove, the sliding rack assembly is stably maintained in the retracted position.

12. The lipstick-type portable computer peripheral apparatus according to claim 11, wherein the actuator portion comprises a hollow cylindrical wedge-shaped structure integrally molded to said handle structure and extending through said rear opening into said tubular housing, said hollow cylindrical wedge-shaped mounting structure having a peripheral edge defining said substantially oval cam surface.

13. The lipstick-type portable computer peripheral apparatus according to claim 11, wherein the actuator portion comprises:
a hollow cylindrical mounting structure integrally molded to disposed said handle structure, a first portion of said substantially oval cam surface being disposed on an inside surface of said mounting structure, and a rotary sleeve fixedly connected to said handle structure and disposed inside said mounting structure, said rotary sleeve including a second portion of said substantially oval cam surface.

14. The lipstick-type portable computer peripheral apparatus according to claim 1, wherein the actuator portion comprises a hollow cylindrical structure disposed inside of the handle structure, and the hollow cylindrical structure defines an oval cam channel that is disposed on an inside surface of said hollow cylindrical structure, and wherein said positioning knob is disposed in the oval cam channel.

15. The lipstick-type portable computer peripheral apparatus according to claim 14, wherein the rear cap assembly comprises:

a first handle portion including a first actuator portion having a first hollow semi-cylindrical structure portion including a first cam surface portion; and a second handle portion including a second actuator portion having a second hollow semi-cylindrical structure portion including a second cam surface portion, wherein said oval cam channel is defined between the first and second cam surface portions when said first handle portion is operably mounted on the second handle portion.

16. The lipstick-type portable computer peripheral apparatus of claim 1, wherein the carrier tray includes an upper tray portion and a lower tray portion that form a clip-like structure, wherein said at least one electronic device comprises a Chip-On-Board (COB) package that is secured to said carrier by said clip-like structure.

17. The lipstick-type portable computer peripheral apparatus of claim 1, wherein said at least one electronic device is disposed on a printed circuit board (PCB), and said plug connector is connected to a front end of the PCB, and, wherein said carrier tray includes a removable upper wall that is snap-coupled to said carrier tray over said PCB.

18. The lipstick-type portable computer peripheral apparatus according to claim 1, wherein the portable computer peripheral apparatus comprises a Universal Serial Bus (USB) device wherein the plug connector includes a substrate having four of metal contacts formed thereon, and a metal plug shell that extends over substrate in accordance with an established USB standard.

19. The lipstick-type portable computer peripheral apparatus of claim 1, wherein the plug connector includes an interface circuit including means for implementing one of a Universal Serial Bus (USB), a Secure Digital (SD), a Micro SD, Multi-Media Card (MMC), a Compact Flash (CF), a Memory Stick (MS), a PCI-Express, a Integrated Drive Electronics (IDE), a Serial Advanced a Technology Attachment (SATA), an external SATA, a Radio Frequency Identification (RFID), a fiber channel and an optical connection protocol.

* * * * *